(12) United States Patent
Xu et al.

(10) Patent No.: US 11,805,225 B2
(45) Date of Patent: Oct. 31, 2023

(54) TRACKER ACTIVATION AND DEACTIVATION IN A VIDEOCONFERENCING SYSTEM

(71) Applicant: PLANTRONICS, INC., Santa Cruz, CA (US)

(72) Inventors: Hai Xu, Beijing (CN); Xi Lu, Beijing (CN); Yongkang Fan, Beijing (CN); Wenxue He, Beijing (CN); Hailin Song, Beijing (CN)

(73) Assignee: PLANTRONICS, INC., Santa Cruz, CA (US)

( * ) Notice: Subject to any disclaimer, the term of this patent is extended or adjusted under 35 U.S.C. 154(b) by 149 days.

(21) Appl. No.: 17/593,957

(22) PCT Filed: Jun. 10, 2020

(86) PCT No.: PCT/CN2020/095293
§ 371 (c)(1),
(2) Date: Sep. 29, 2021

(87) PCT Pub. No.: WO2021/248348
PCT Pub. Date: Dec. 16, 2021

(65) Prior Publication Data
US 2022/0329755 A1 Oct. 13, 2022

(51) Int. Cl.
*H04N 7/14* (2006.01)
*G06V 40/20* (2022.01)
(Continued)

(52) U.S. Cl.
CPC ........... *H04N 7/147* (2013.01); *G06V 40/161* (2022.01); *G06V 40/23* (2022.01); *G06V 40/28* (2022.01); *H04N 7/15* (2013.01)

(58) Field of Classification Search
CPC ........ H04N 7/147; H04N 7/15; G06V 40/161; G06V 40/28; G06V 10/453; G06V 40/23
(Continued)

(56) References Cited

U.S. PATENT DOCUMENTS 9,684,830 B2   6/2017 Kim
9,852,513 B2   12/2017 Wu
(Continued)

FOREIGN PATENT DOCUMENTS

CN    1924894 A     3/2007
CN    1924895 A  *  3/2007
(Continued)

OTHER PUBLICATIONS

International Search Report and Written Opinion dated Mar. 8, 2021 for PCT/CN2020/095293.
(Continued)

*Primary Examiner* — Melur Ramakrishnaiah
(74) *Attorney, Agent, or Firm* — QUARLES & BRADY LLP

(57) ABSTRACT

A method of tracking a presenter during a videoconference, comprising: detecting, in a data stream, data indicating a presence of one or more persons at a videoconferencing endpoint, the data stream comprising a plurality of frames; detecting tracker initiation data (e.g., that a person is actively talking, or that a person has raised their hand, or both) in the data stream; determining a subject of interest responsive to the tracker initiation data, and tracking the subject of interest as they move while making a presentation.

21 Claims, 18 Drawing Sheets

(51) Int. Cl.
*G06V 40/16* (2022.01)
*H04N 7/15* (2006.01)

(58) Field of Classification Search
USPC .......................................... 348/14.01–14.16
See application file for complete search history.

(56) References Cited

U.S. PATENT DOCUMENTS

| | | | |
|---|---|---|---|
| 10,187,579 B1 | 1/2019 | Wang | |
| 2004/0105004 A1* | 6/2004 | Rui | H04N 7/181 |
| | | | 348/E7.086 |
| 2019/0007623 A1* | 1/2019 | Wang | H04N 7/147 |
| 2019/0156849 A1 | 5/2019 | Feng | |
| 2020/0344278 A1* | 10/2020 | Mackell | H04L 65/1083 |
| 2021/0051035 A1* | 2/2021 | Atkins | H04L 12/1827 |

FOREIGN PATENT DOCUMENTS

| | | | | |
|---|---|---|---|---|
| CN | 1924895 | A | 3/2007 | |
| CN | 102324025 | A | 1/2012 | |
| CN | 106796657 | A | 5/2017 | |
| CN | 108701359 | A | 10/2018 | |
| EP | 3647907 | A1 * | 5/2020 | ............. G06F 3/011 |
| EP | 3647907 | A1 | 5/2020 | |

OTHER PUBLICATIONS

Henriques, J.F, Caseiro, R., Martins, P. and Batista, J., "High-Speed Tracking with Kernelized Correlation Filters," in IEEE Transactions on Pattern Analysis and Machine Intelligence, vol. 37, No. 3, pp. 583-596, Mar. 1, 2015, doi: 10.1109/TPAMI.2014.2345390.

Wang, N., Shi, J., Yeung, D. Y., & Jia, J. "Understanding and Diagnosing Visual Tracking Systems." In Proceedings of the IEEE International Conference on Computer Vision (pp. 3101-3109), (2015).

Park, J. W., Kim, S., Lee, Y., & Joe, I. Improvement of the KCF Tracking Algorithm Through Object Detection. International Journal of Engineering and Technology (UAE), (2018); 7(4), 11-12.

* cited by examiner

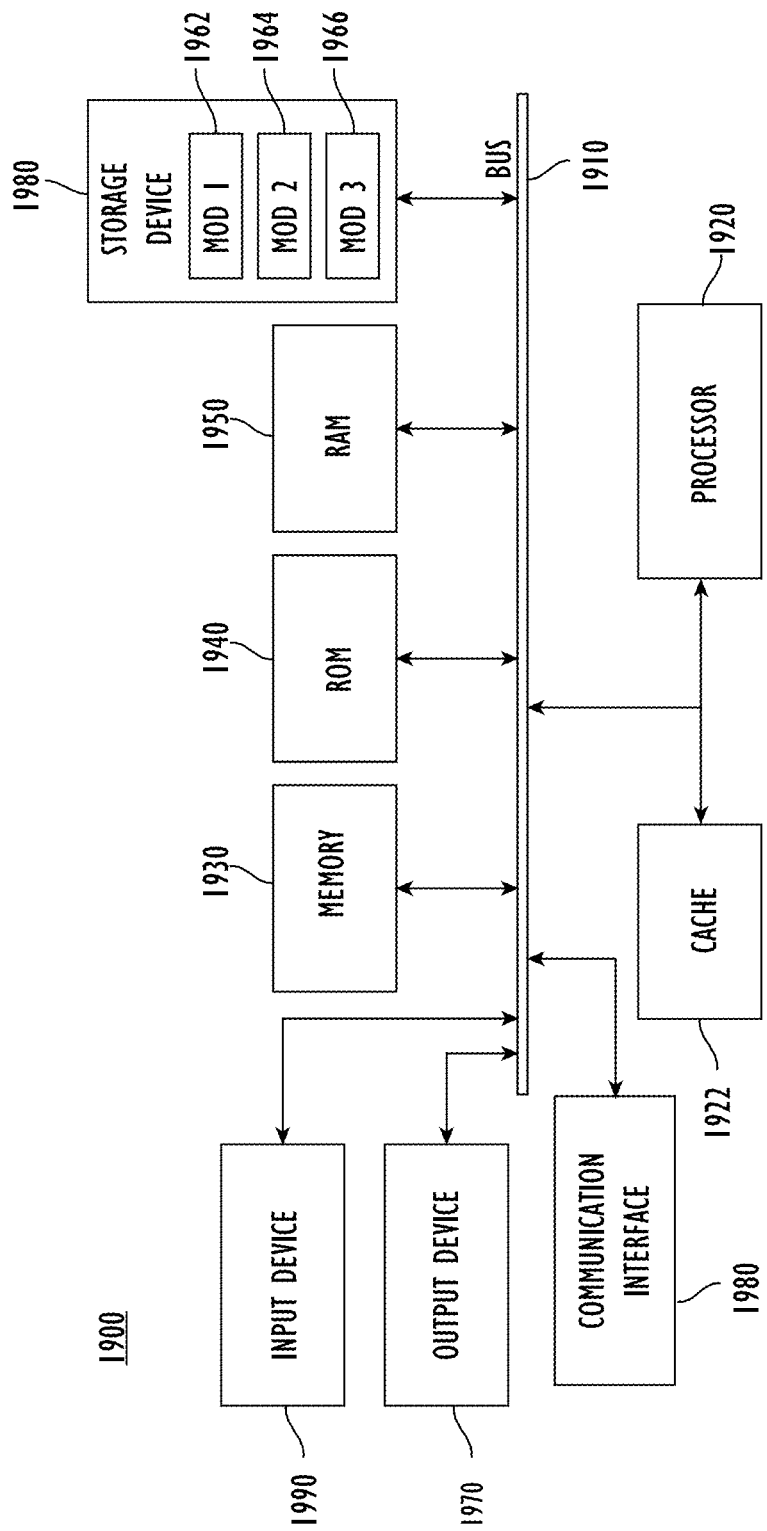

TRACKER ACTIVATION AND DEACTIVATION IN A VIDEOCONFERENCING SYSTEM

TECHNICAL FIELD

This disclosure relates generally to videoconferencing and relates particularly to tracking the location of an active videoconference participant who is moving.

BACKGROUND

During a videoconference, people at a videoconferencing endpoint interact with people at one or more other videoconferencing endpoints. A person at a videoconferencing endpoint might give a presentation or make a speech, during which that person might walk or move. Attempts to develop systems which initiate and disengage tracking of such presenter have not been wholly successful. Thus, there is room for improvement in the art.

SUMMARY

Examples of this disclosure pertain to videoconferencing systems which automatically discern that a person at a videoconferencing endpoint is a presenter and accurately tracking the presenter when she changes location at the endpoint so that people at a remote endpoint will be able to seamlessly follow her while she moves. Examples of this disclosure also pertain to enabling videoconference participants to start and stop presenter tracking without manual intervention, such as by waving their hand during a video conference.

An example of this disclosure includes method of tracking a presenter during a videoconference, comprising: detecting, in a data stream, data indicating a presence of one or more persons at a videoconferencing endpoint, the data stream comprising a plurality of frames; detecting tracker initiation data (e.g., detecting that a person is actively talking, or that a person has raised her hand, or both) in the data stream; determining, responsive to detecting the tracker initiation data, a subject of interest from among the one or more persons within a second frame of the data stream; determining a tracking region within a third frame of the data stream, the tracking region corresponding to the subject of interest and having a size and location; tracking the subject of interest, wherein tracking the subject of interest comprises iteratively: comparing data of one or more subregions of one or more subsequent frames to the data of the tracking region, the sizes and locations of the one or more subregions being based on the size and location of the tracking region; detecting, among the one or more subregions, a subregion depicting the subject of interest; and designating the subregion depicting the subject of interest as the tracking region. In some examples, the method of tracking the presenter also includes: detecting tracker deactivation data within the data stream; ceasing to track the subject of interest, responsive to detecting the tracker deactivation data; and searching for data corresponding to one or more persons within one or more further subsequent frames of the data stream.

Another example of this disclosure includes a videoconferencing system which includes one or more cameras coupled to a processor, in which the processor is configured to: capture a data stream using the one or more cameras, the data stream comprising a plurality of frames; detect, in the data stream, data indicating a presence of one or more persons at a videoconferencing endpoint; detect tracker initiation data (e.g., detecting that a person is actively talking, or that a person is waving his hand, or both) in the data stream; determine, responsive to detecting the tracker initiation data, a subject of interest from among the one or more persons within a second frame of the data stream; determine a tracking region within a third frame of the data stream, the tracking region corresponding to the subject of interest and having a size and location; and track the subject of interest. The subject of interest is tracked by iteratively: comparing data of one or more subregions of one or more subsequent frames to the data of the tracking region, the sizes and locations of the one or more subregions being based on the size and location of the tracking region; detecting, among the one or more subregions, a subregion depicting the subject of interest; and designating the subregion depicting the subject of interest as the (new) tracking region. In some examples, the processor is also configured to: detect tracker deactivation data within the data stream; stop tracking the subject of interest, responsive to detecting the tracker deactivation data; and search for data corresponding to one or more persons within one or more further subsequent frames of the data stream to begin tracking a new or different presenter, if necessary. Detecting tracker deactivation data can include detecting that the person giving a presentation has waved his hand after talking for a while.

Another example of this disclosure includes a non-transitory computer readable medium storing instructions executable by a processor. The instructions include instructions to, among other things, capture a data stream using one or more cameras, the data stream comprising a plurality of frames; detect, in the data stream, data indicating a presence of one or more persons at a videoconferencing endpoint; detect tracker initiation data (e.g., detecting that a person has begun talking, or that a person is waving his hand, or both) in the data stream; determine, responsive to detecting the tracker initiation data, a subject of interest from among the one or more persons within a second frame of the data stream; determine a tracking region within a third frame of the data stream, the tracking region corresponding to the subject of interest and having a size and location; track the subject of interest. In one or more examples, the instructions to track the subject of interest comprise instructions to repeatedly (e.g., iteratively): compare data of one or more subregions of one or more subsequent frames to the data of the tracking region, the sizes and locations of the one or more subregions being based on the size and location of the tracking region; detect, among the one or more subregions, a subregion depicting the subject of interest; and designate the subregion depicting the subject of interest as the tracking region, and thereby keep updating the tracking region, so that viewers will continue to see the presenter in the center of a view area even when the presenter walks around while talking. The instructions also include instructions which will cause the processor to: detect tracker deactivation data within the data stream; cease to track the subject of interest, responsive to detecting the tracker deactivation data; and thereafter search for data corresponding to one or more persons within one or more further subsequent frames of the data stream.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIG. 19 illustrates an electronic device which can be used to practice one or more methods of this disclosure.

DETAILED DESCRIPTION

Figure 1:
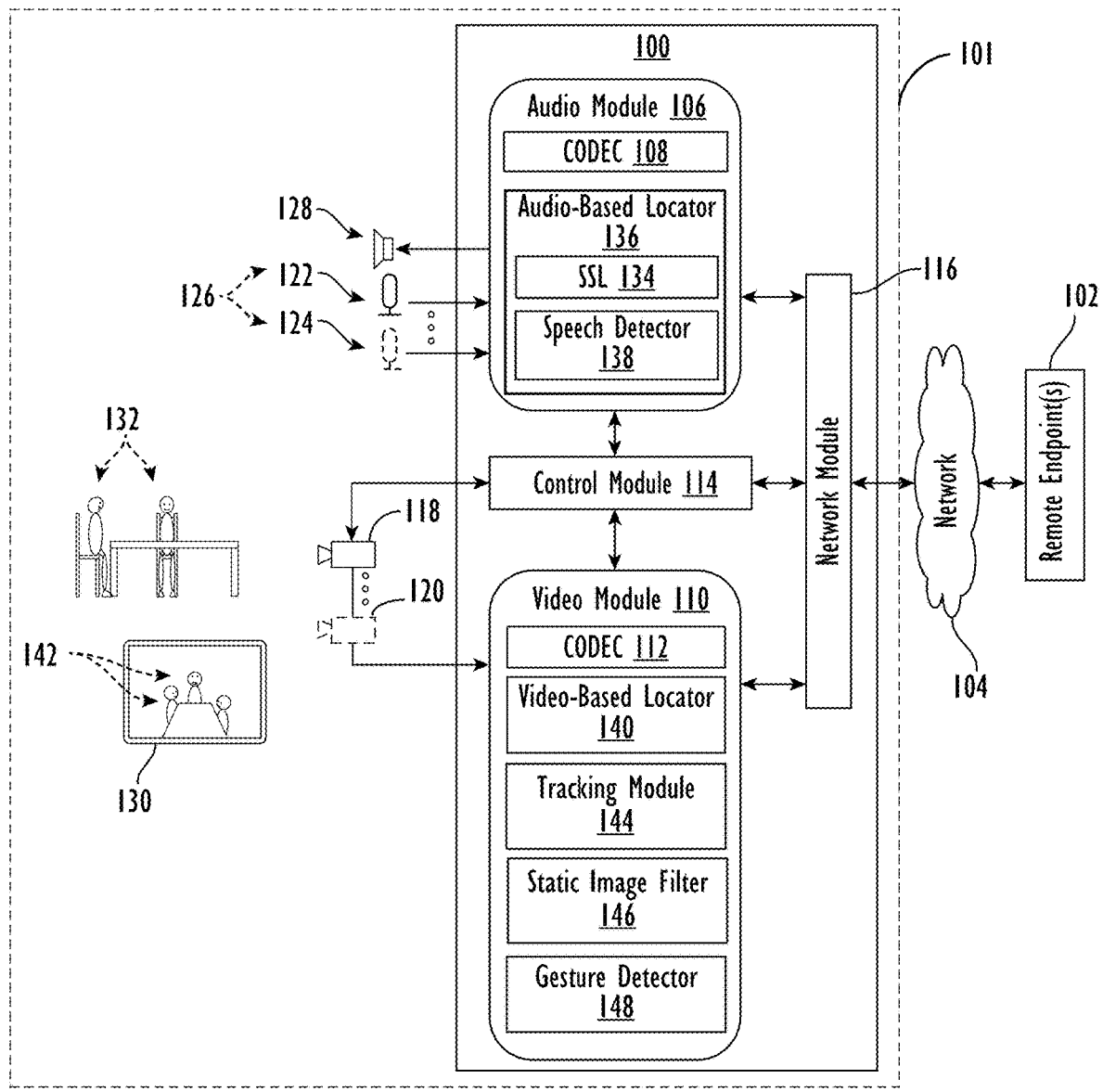
FIG. 1 illustrates a videoconferencing system, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

In at least one example of this disclosure, a videoconferencing device can detect and focus on an active talker. One or more microphones can be used to determine the direction from the videoconferencing device to the active talker. One or more microphones can be used to determine the location of a subject (e.g., an active talker), relative the microphones and/or relative one or more cameras. In one or more examples of this disclosure, one or more cameras are used to locate the face of an active talker. Based on the direction and the location, a view of the active talker can be captured for transmission to another endpoint and the active talker can be tracked during a videoconference, in accordance with one or more examples.

FIG. 1 illustrates a videoconferencing system 100 at a videoconferencing endpoint 101, in accordance with an example of this disclosure. The videoconferencing system 100 includes multiple components to provide a pleasant videoconferencing experience. The videoconferencing system 100 enables people at the videoconferencing endpoint 101 to communicate with people at one or more remote videoconferencing endpoints 102 over a network 104. Components of the (videoconferencing) system 100 include an audio module 106 with an audio codec 108, and a video module 110 with a video codec 112. Video module 110 includes a video-based locator 140, which is used to locate videoconference participants 132 during videoconferences. Video module 110 also includes a tracking module 144, which is used to track the locations of videoconference participants 132 at the videoconferencing endpoint 101. Video module 110 also includes a static image filter 146 which can be used to detect static portions of video image frames and minimize potential tracking errors. Video module 110 also includes a gesture detector 148, which can be used to detect when a (videoconference) participant 132 makes a gesture such as waving their hand or raising their hand. Audio module 106 and video module 110 are operatively coupled to a control module 114 and a network module 116. The (videoconferencing) system 100 includes and/or is coupled to least one camera 118 at the (videoconferencing) endpoint 101. The camera(s) 118 can be used to capture a video component of a data stream at the endpoint 101. Such a data stream contains a series of frames, which can include image frames and related audio; a given image frame can consist of one or more contiguous and/or non-contiguous image frames as well as one or more overlapping or non-overlapping image frames. In accordance with one or more examples of this disclosure one or more contiguous and/or non-contiguous image frames and one or more overlapping or non-overlapping image frames are regions of an image frame. In accordance with one or more examples of this disclosure, one or more contiguous and/or non-contiguous image frames and one or more overlapping or non-overlapping image frames are subregions of an image frame. In some examples of this disclosure, the endpoint 101 includes one or more additional cameras 120. The camera(s) 118 can be used to detect (video) data indicating a presence of one or more persons (e.g., participants 132) at the endpoint 101. In some examples, when a participant 132 is zoomed in upon by a camera (e.g., 118), a sub-portion of the captured image frame containing the participant 132 is rendered—e.g., displayed on a display 130 and/or transmitted to a remote endpoint 102—whereas other portions of the image frame are not.

During a videoconference, camera 118 captures video and provides the captured video to the video module 110. In at least one example of this disclosure, camera 118 is an electronic pan-tilt-zoom (EPTZ) camera. In some examples, camera 118 is a smart camera. In some examples, camera 118 is an EPTZ camera and is also a smart camera. In some examples, one or more additional cameras (e.g., 120) can be cascaded with camera 118 such that camera 118 controls some or all operations of such additional cameras. In accordance with one or more examples of this disclosure, one or more cameras (e.g., 118, 120) are releasably coupled to one or more processors of the system 100 (e.g., 208, shown in FIG. 2). Additionally, one or more microphones (e.g., 122, 124) capture audio and provide the captured audio to the audio module 106 for processing. The captured audio and concurrently captured video can form a data stream. (See preceding paragraph.) Microphone 122 can be used to detect (video) data indicating a presence of one or more persons (e.g., participants 132) at the endpoint 101. Microphone 122 can be a table or ceiling microphone or be part of a microphone pod or the like. In one or more examples, microphones 122, 124 are tightly coupled with camera 118. The system 100 can use the audio captured with microphone 122 as conference audio.

In some examples, the microphones 122, 124 can reside within a microphone array (e.g., 126) that includes both vertically and horizontally arranged microphones for determining locations of audio sources, e.g., participants 132 who are speaking. In some examples, the system 100 uses audio from one or more microphones (e.g., 122, 124) for participant tracking purposes. In some examples, the system 100 uses audio from microphones 122, 124 for camera tracking. In one or more examples, the system 100 uses audio from microphones 122, 124 to determine locations of (videoconference) participants 132.

After capturing audio and video, the system 100 encodes the captured audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 101 also includes a loudspeaker 128 which outputs conference audio, and a display 130 which outputs conference video.

Using camera 118, the system 100 can capture a view of a room at the endpoint 101, which would typically include all (videoconference) participants 132 at the endpoint 101, as well as some of their surroundings. According to some examples, the system 100 uses camera 118 to capture video of one or more participants 132, including one or more current talkers, in a tight or zoom view. In at least one example, camera 118 is associated with a sound source locator (e.g., 134) of an audio-based locator (e.g., 136).

In some examples, the system 100 may alternate between presenting tight views of a speaker and wide views of a room. In accordance with some examples, the system 100 outputs a group view (e.g., 308, 608) when no participant 132 is speaking, and a person view (e.g. 411) when a participant 132 is speaking. If the system 100 determines that a participant 132 is a presenter, the system 100 can render a presenter view in a presenter viewing window. The presenter viewing window can be displayed on a display (e.g., 130) and/or transmitted to a remote endpoint 102.

In one or more examples, the system 100 may use the audio-based locator 136 and a video-based locator 140 to determine locations of participants 132 and frame views of the environment and participants 132. The control module 114 may use audio and/or video information from these locators 136, 140 to crop one or more captured views, such that one or more subsections of a captured view will be displayed on a display 130 and/or transmitted to a remote endpoint 102.

In some examples, to determine how to configure a view, the control module 114 uses audio information obtained from the audio-based locator 136 and/or video information obtained from the video-based locator 140. For example, the control module 114 may use audio information processed by the audio-based locator 136 from one or more microphones (e.g., 122, 124). In some examples, the audio-based locator (e.g., 136) includes a speech detector 138 which can be used to detect speech in audio captured by microphones 122, 124 to determine a location of a current participant 132. In some examples, the control module 114 uses video information captured using camera 118 and processed by the video-based locator 140 to determine the locations of participants 132 and to determine the framing for captured views.

In some examples of this disclosure, a wide view can be used to give context to a zoom view. In some examples, camera 118 can capture both such views simultaneously insofar as the zoom view is a portion of the wide view. The magnification level of a zoom view will normally be greater than the magnification level of the wide view from which the zoom view is taken. In some examples, switching from a first view to a second view for transmission to a remote endpoint 102 will not occur until an active participant 132 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 132 at an endpoint 101, the cultural niceties of the remote participants 142 at the remote endpoint 102, and the sizes of one or more displays 130 displaying captured views.

Figure 2:
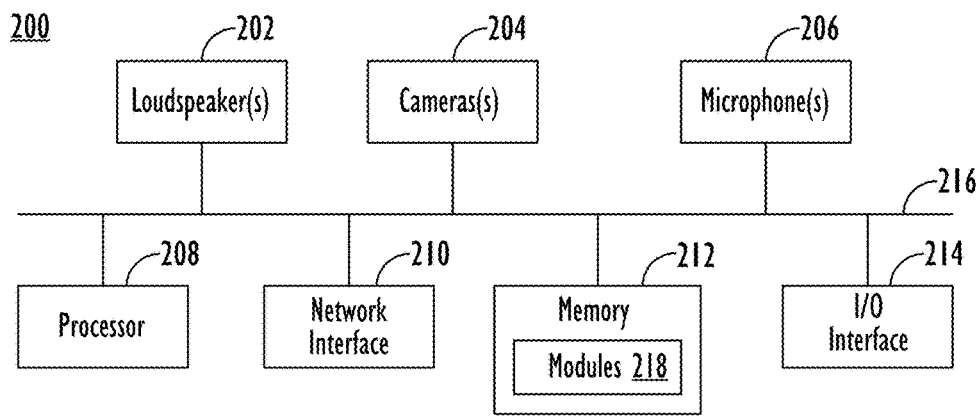
FIG. 2 illustrates aspects of the videoconferencing system, in accordance with an example of this disclosure.

FIG. 2 illustrates components 200 of the videoconferencing system 100, in accordance with an example of this disclosure. The components 200 include one or more loudspeaker(s) 202 (e.g., 128), one or more camera(s) 204 (e.g., 118) and one or more microphone(s) 206 (e.g., 122, 124). The components 200 also include a processor 208, a network interface 210, a memory 212 and a general input/output interface 214, all coupled by bus 216.

The memory 212 can be any standard memory such as SDRAM. The memory 212 stores modules 218 in the form of software and/or firmware for controlling the system 100. In addition to audio codec 108 and video codec 112, and other modules discussed previously, the modules 218 can include operating systems, a graphical user interface that enables users to control the system 100, and algorithms for processing audio/video signals and controlling the camera(s) 204. In at least one example of this disclosure, one or more of the cameras 204 can be a panoramic camera.

The network interface 210 enables communications between the endpoint 101 and remote endpoints 102. In one or more examples, the interface 210 provides data communication with local devices such as a keyboard, mouse, printer, overhead projector, display, external loudspeakers, additional cameras, and microphone pods, etc.

The camera(s) 204 and the microphone(s) 206 capture video and audio in the videoconference environment, respectively, and produce video and audio signals transmitted through bus 216 to the processor 208. In at least one example of this disclosure, the processor 208 processes the video and audio using algorithms of modules 218. For example, the system 100 processes the audio captured by the microphone(s) 206 as well as the video captured by the camera(s) 204 to determine the location of participants 132 and control and select from the views of the camera(s) 204. Processed audio and video can be sent to remote devices coupled to network interface 210 and devices coupled to general interface 214.

Figure 3:
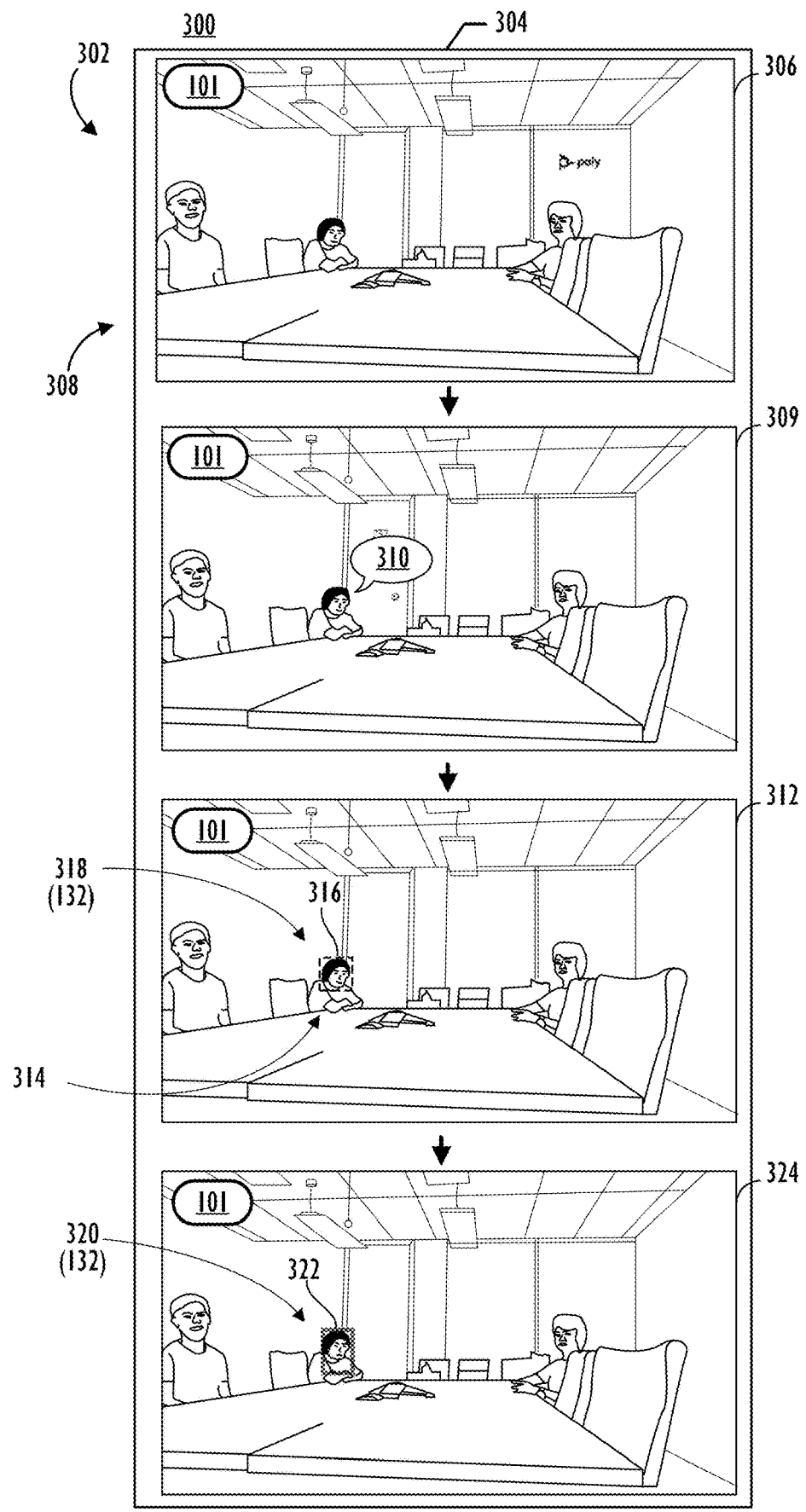
FIG. 3 illustrates aspects of a group view mode of the videoconferencing system, in accordance with an example of this disclosure.

FIG. 3 illustrates a process 300 of the system 100 operating in a group view mode 302 in which the system 100 captures a series 304 of image frames using camera 118, in accordance with an example of this disclosure. The first image frame 306 shows a group view 308 of an endpoint 101 captured by the system 100 operating in the group view mode 302. In the group view mode 302, most participants 132 at the endpoint 101 will be captured and displayed to a remote endpoint 102.

In image frame 309, the system 100—still in the group view mode 302—detects audio (data) 310 at the endpoint 101. Audio (data) 310 indicates a presence of one or more persons (e.g., participants 132) at the endpoint 101, so the system 100 determines whether there is a face corresponding to the audio 310. In image frame 312, the system 100 has determined that there is a face 314 which corresponds to the detected audio 310. The face 314 is within a face box 316. The face box 316 indicates a region in the image frame 312 that contains facial features, (e.g., personage objects consistent with a face). The (video) data corresponding to the face 314 is, like audio 310, indicative of the presence of a participant 132 at the endpoint 101. The participant 132, Xi LU, to whom the face 314 belongs, is therefore an active talker 318 in accordance with this disclosure. Having been determined to be an active talker 318, participant Xi LU can be treated as a subject of interest 320 by the system 100 and have her location at the endpoint 101 tracked using a presenter tracking box 322, as shown in image frame 324. The audio 310 and imaging data of Xi LU that the system 100 uses to determine that she is an active talker is thus presenter tracking initiation data.

Figure 4:
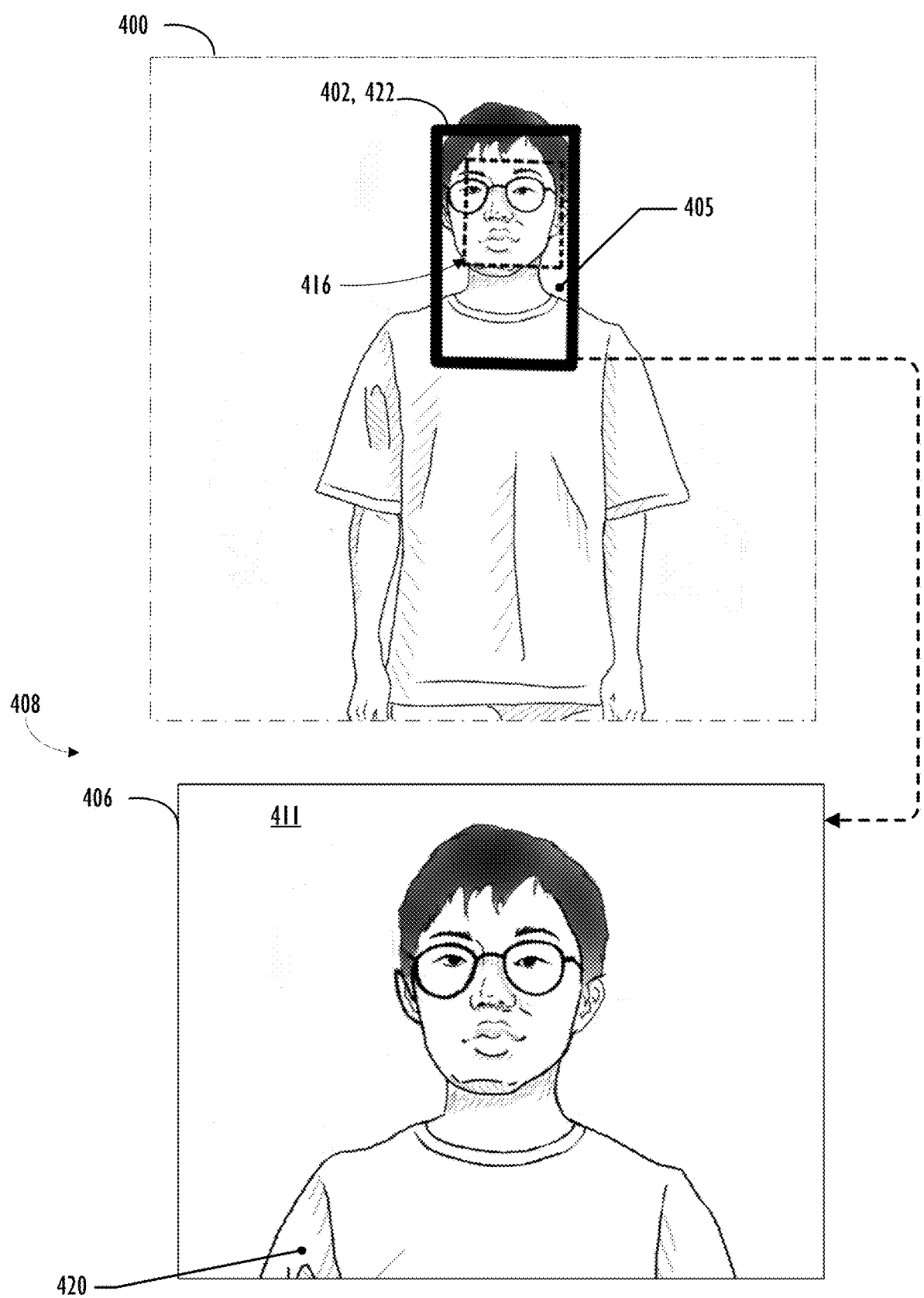
FIG. 4 illustrates aspects of a person view mode of the videoconferencing system, in accordance with an example of this disclosure.

Continuing with the foregoing discussion, FIG. 4 illustrates further operations of the system 100, in accordance with an example of this disclosure. FIG. 4 shows Xi LU in an image frame 400 of a data stream captured by the system 100. Accompanying the image frame 400 is a viewing window 406. The viewing window 406 is derived from the image frame 400. Overlaid on the image frame 400 is an upper-body box 402 and a face box 416 (e.g., 316). The upper-body box 402 indicates that the system 100 has detected personage objects (e.g., features) consistent with a person's upper-body. The upper-body box 420 contains a region of the image frame 400 which have been determined by the system 100 to contain personage objects (e.g., features) corresponding to a person. The upper-body box 402 is also a presenter tracking box 422 (e.g., 322). The area inside the presenter tracking box 422 is a tracking region 405. The (video) data of the tracking region 405 is consistent with the presence of a person at an endpoint 101. As new image frames 400 of video are captured, new regions 405 are searched for personage objects (e.g., features) like those in the upper-body box 402 and/or the presenter tracking box 422. In accordance with various examples of this disclosure, Xi LU is considered a subject of interest 420 (e.g., 320) and the presenter tracking box 422 is updated in an iterative fashion to track Xi LU's location, thereby allowing remote conference participants 142 to see her in the viewing window 406 as she moves. In some examples of this disclosure, the proportions and magnification of the viewing window 406 are based on the presenter tracking box 422. As subject of interest Xi LU walks from one place to another, the presenter tracking box 422 will keep track of her location, and so she will continue to be centrally located in the viewing window 406, as shown. During a videoconference, the system 100 will normally transmit the viewing window 406 to a remote endpoint 102. The presenter tracking box 422 can track human personage objects (e.g., features) in the tracking region 405 and can correspond to an upper-body box 402 or a face box 316. In some examples of this disclosure, the system 100 generates the viewing window 406 while operating in a person view mode 408. The images of the viewing window 406 generated by the system 100 while in the person view mode 408 correspond to a person view 411 (zoom view).

Figure 5:
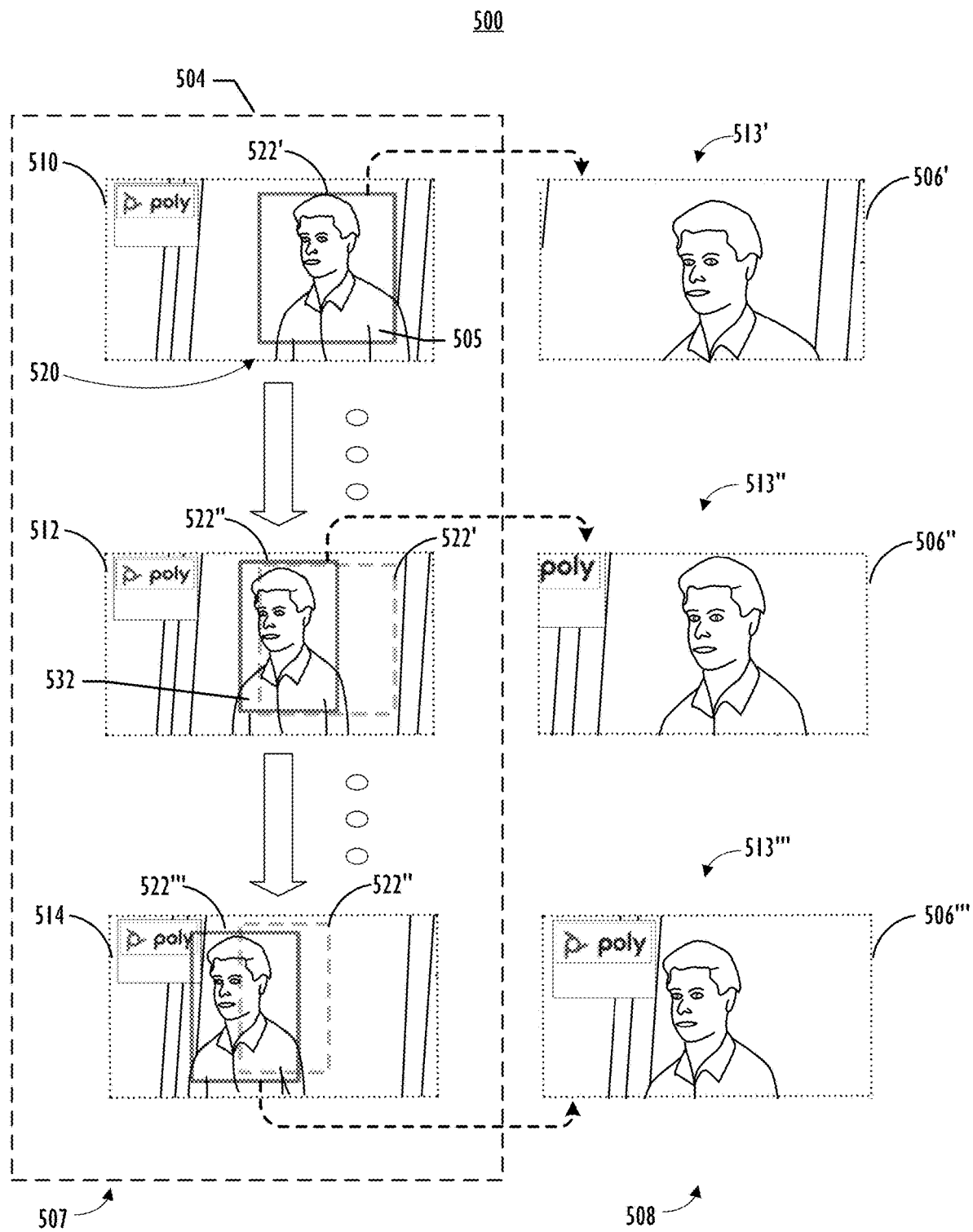
FIG. 5 illustrates aspects of a presenter tracking mode of the videoconferencing system, in accordance with an example of this disclosure.

FIG. 5 illustrates a process 500 of tracking a subject of interest 520 (e.g., 320), in accordance with an example of this disclosure. FIG. 5 shows a series 504 (e.g., 304) of image frames captured by the system 100 and their corresponding viewing windows 506 (e.g., 406), in which J.D. is the subject of interest 520. The viewing windows 506 each show a presenter view 513. In the first image frame 510, personage objects (e.g., features) of J.D.'s upper body are within a tracking region 505 (e.g., 405) of a presenter tracking box 522'. Although J.D. is positioned rightward within image frame 510, he is centrally located within corresponding viewing window 506' generated by the system 100. (In some examples of this disclosure, the magnification level, and proportions of the viewing window 506' are based, at least in part, on those of the presenter tracking box 522'.) In the next image frame 512, J.D. has walked forward. The system 100 compares the features in the new presenter tracking box 522" with those of the earlier presenter tracking box 522' to help ensure that the participant 532 (e.g., 132) in the current presenter tracking box 522" is the same participant 132 (J.D.) of the earlier presenter tracking box 522'. Comparing data in a current tracking region 505 with data of earlier tracking regions 505 is part of the presenter tracking process 500 performed by the system 100 using the tracking module 144. With respect to image frame 512, J.D. is again centrally located within the corresponding viewing window 506. Normally, the image frame of the viewing window 506 is a subregion of an image frame (e.g., 510) captured by the system 100 using a camera (e.g., 118). In some examples of this disclosure, multiple views can be taken from the same series of image frames (e.g., 304). For example, the views shown in series of image frames 504 can generally be drawn from larger image frames captured by the system 100 using a single camera (e.g., 118). As shown in the last frame 514 of the series of image frames 504, J.D. has continued to move forward, and the presenter tracking box 522''' has continued to track him. The features within the current presenter tracking box 522''' are compared to those of one or more earlier presenter tracking boxes 522. In at least some examples of this disclosure, data of more recent presenter tracking boxes 522 is weighted more heavily than data of earlier presenter tracking boxes 522. In some examples of this disclosure, the features in the presenter tracking box 522 can also be compared to the features from an upper-body box (e.g., 402) that was generated by the system 100 as a precursor to the presenter tracking process 500. In some examples of this disclosure, the features in the presenter tracking box 522 can also be compared to the features from a face box (e.g., 316, 416) that was generated by the system 100 as a precursor to the presenter tracking process 500. Again, though J.D. has walked from one place to another, the system 100 has tracked his position, and he has remained close to the center of the viewing window 506 throughout the process 500. The system 100 can operate in a plurality of modes simultaneously. For example, in some implementations of this disclosure, the system 100 tracks the subject of interest 520 while operating in a presenter tracking mode 507 and generates the viewing windows 506 while concurrently operating in a person view mode 508 (e.g., 408).

Figure 6:
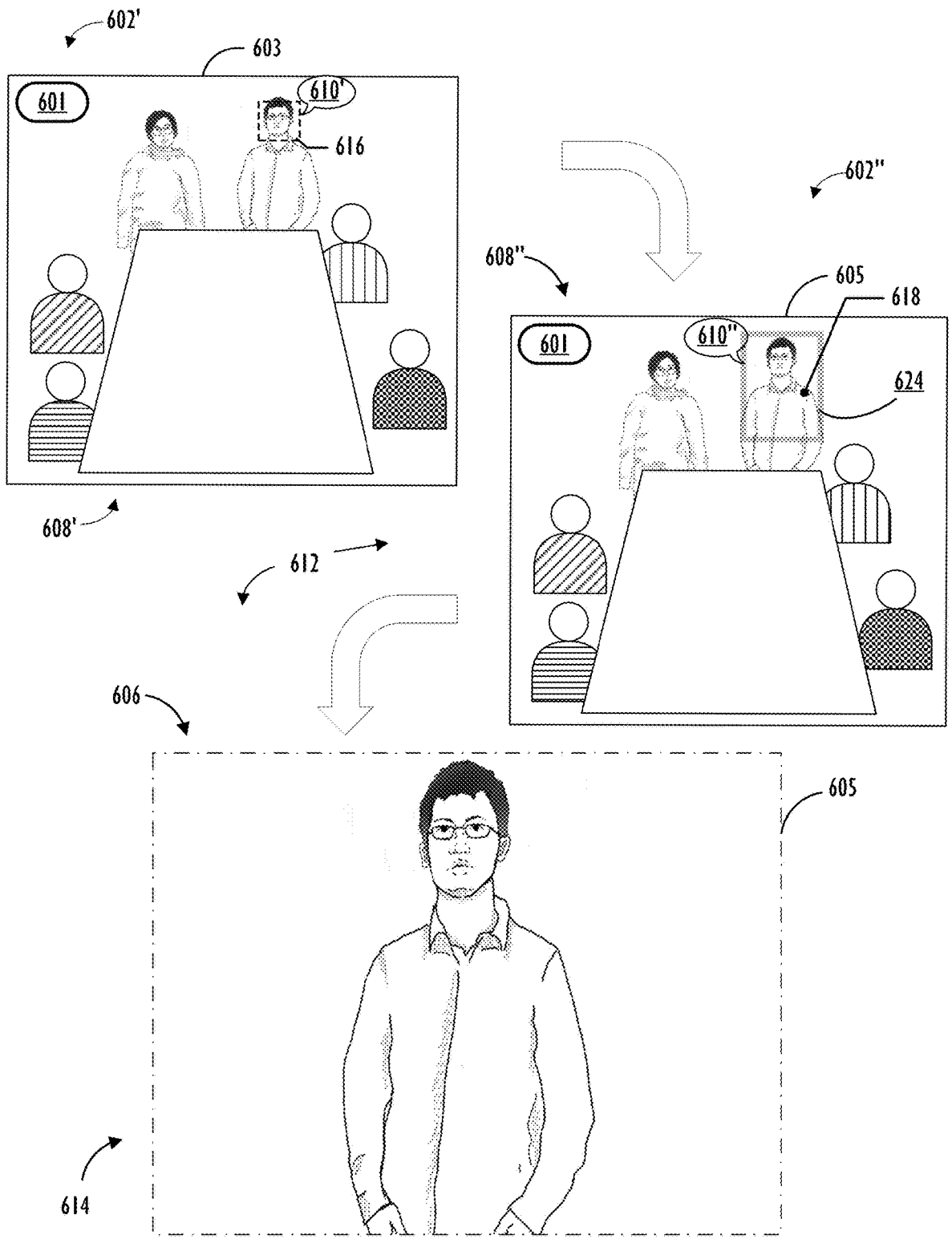
FIG. 6 illustrates aspects of an active talker mode of the videoconferencing system, in accordance with an example of this disclosure.

FIG. 6 illustrates a process 600 of the system 100, in accordance with an example of this disclosure. FIG. 6 shows a first image frame 603 captured at an endpoint 601 (e.g., 101) by the system 100 while operating in a group view mode 602 (e.g. 302). The first image frame 603 shows the endpoint 601 in a group view 608 (e.g., 308). The system 100 detects audio 610 (e.g., 310) and locates Tianran WANG's face within a face box 616 (e.g., 316, 416). Tianran WANG is thus an active talker 618 (e.g., 318) as indicated in image frame 605, so the system 100 enters an active talker mode 612. Although the system 100 has entered the active talker mode 612, the system 100 can remain in the group view mode 602, as illustrated in image frame 605, in which the endpoint 601 continues to be shown in a group view 608. As Tianran WANG continues to talk the system 100 will—as part of being in the active talker mode—continue to capture the audio 610 of his speech and track him in an active talker box 624. While operating in the active talker mode 612, the system 100 generates a viewing window 606, as shown in image frame 607. The viewing window 606 shows an active talker view 614. The size and magnification of the image frames in the viewing window 606 are based on the active talker box 624, and the system 100 will tend to keep him centrally located within the viewing window 606 as part of the system's operations of the active talker mode 612. In some examples of this disclosure, the system 100 will continue to present the group view 608 while the system 100 presents the active talker view 614 of the viewing window 606. In some other examples of this disclosure, the system 100 will stop presenting the group view 608 while the system 100 presents the active talker view 614, (though the system 100 will continue to capture audio and video at the endpoint 601). However, the system 100 does not track the location of conference participants 132 as part of operations of the active talker mode 612. The active talker mode 612 can thus be distinguished from the presenter tracking mode 507. If, for example, Tianran WANG were to walk past Xi LU, who is standing to his right, the viewing window 606 would no longer contain him.

Figure 7:
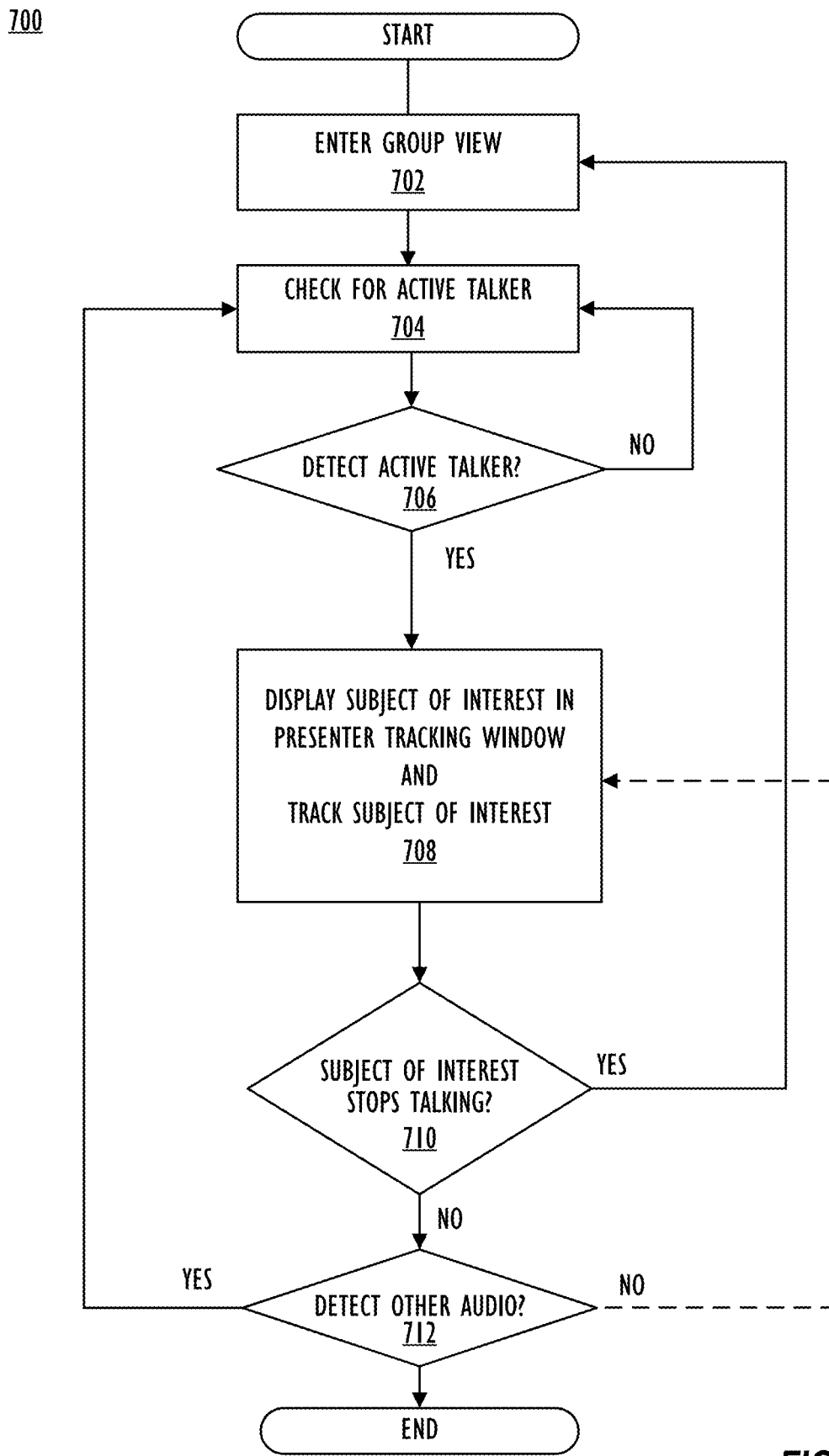
FIG. 7 illustrates a method of tracking a person making a presentation, in accordance with an example of this disclosure.

FIG. 7 illustrates a method 700 in accordance with an example of this disclosure. At the beginning of the method 700, the system 100 enters 702 a group view mode 302, 602, in which most participants 132 at an endpoint 101 will be captured and displayed to a remote endpoint 102. Having entered 702 the group view mode 302, 602, the system 100 checks for audio (e.g., 310, 610), and if audio 310, 610 is detected, the system 100 will check 704 to determine whether the audio 310, 610 corresponds to an active talker (e.g., 318, 618). As noted in the discussion of FIG. 3, checking 704 for an active talker 318, 618 can include determining whether there is face data corresponding to the location of the detected audio 310, 610. In accordance with the method 700, if an active talker 318, 618 is detected 706, at step 708 the system 100 will enter a presenter tracking mode 507 and the active talker 318 (who is a videoconference participant 132) will be treated as a subject of interest (e.g., 520) whose location will be tracked. Also, at step 708, the subject of interest 520 will be displayed in a presenter view 513, such as a zoom view, in which the subject of interest 520 is centrally located. As part of the method 700, the system 100 can also determine 710 if the subject of interest 520 has stopped talking. If the subject of interest 520 stops talking for a while, such as for twenty seconds, the system 100 will return to the group view mode of step 702 and proceed to check 704 for active talkers 318, 618 as before. As the system 100 tracks 708 the subject of interest 520, the system 100 can detect 712 other audio 310, 610 at the endpoint 101. If the system 100 detects 712 audio 310, 610 which does not correspond to the active talker 318, 618, the system 100 can check 704 to determine if a different participant 132 has started to talk and begin to track 708 the new participant 132 as a subject of interest 520 and display the new subject of interest 520 in a presenter view 513 as was done for the first active talker 318, 618.

Figure 8:
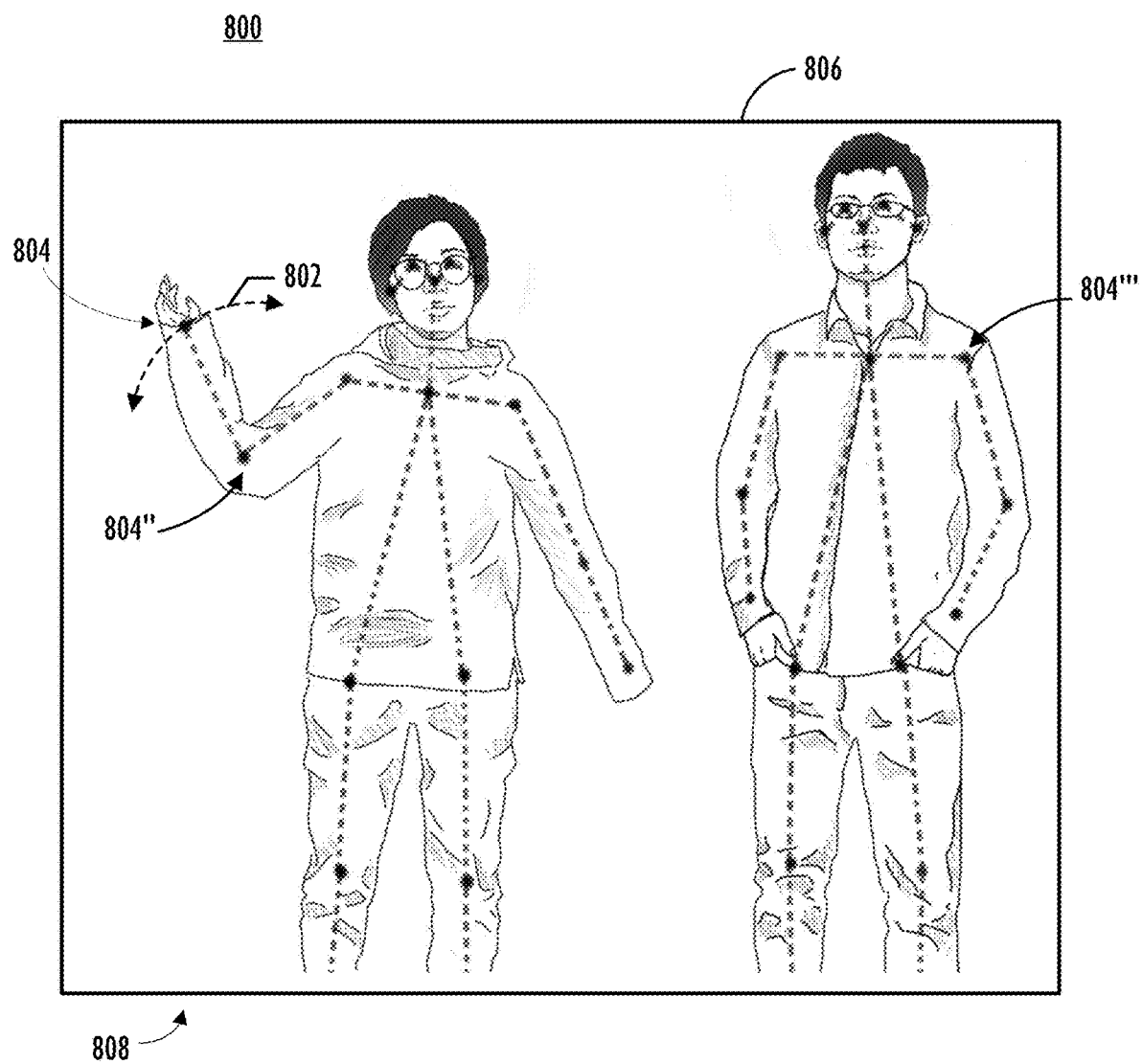
FIG. 8 illustrates a method of detecting an attention-seeking gesture, in accordance with an example of this disclosure.

Thus far, a first manner for initiating presenter tracking has been explored. FIG. 8 introduces a second.

FIG. 8 illustrates aspects of a method 800 of detecting hand waving or a similar attention seeking gesture 802, in accordance with an example of this disclosure. Hand waving or a similar attention seeking gesture 802 can indicate a presence of one or more persons (e.g., participants 132) at an endpoint 101. FIG. 8 shows an image frame 806 captured by the system 100 in which Xi LU and Tianran WANG are standing in a group view 808 (e.g., 308, 608). Xi LU is waving her right hand. In some examples of this disclosure, the system 100 will enter a presenter tracking mode 507 when the system 100 detects that a conference participant 132 (e.g., Xi LU) has raised or waved her hand. Method 800 is a bottom up detection method 800 for detecting attention gestures. In the bottom up detection method 800, key points 804 are detected from the image frame 806 and then whether a participant 132 is performing an attention gesture is detected from the key points 804 detected from one or more images 806. In at least one example of this disclosure, a key point 804 is a reference location that is a defined location with respect to a human body. For example, key points 804 for the location of feet, knees, hips, hands, elbows, shoulders, head, face, etc. can be detected from the image frame. In one or more examples, the system 100 uses a machine learning model that includes an artificial neural network with one or more convolutional layers to generate the key points 804 from the image frame. The machine learning model may be trained using backpropagation to update the weights of the machine learning model.

Examples of neural networks for key point detection include PoseNet detector and OpenPose detector, which take an image frame as input data and generate locations and confidence scores for key points 804 as output data. The number of layers used in the networks may be based on which network architecture is loaded. As an example, when using PoseNet detector with a MobileNetV1 architecture and a 0.5 multiplier, the number of layers may be 56.

In one or more examples, the system 100 analyzes the location of a set of key points 804 in a series of image frames (e.g., 504) over a duration of time to determine whether an attention gesture has been made by a participant 132. For example, when the system 100 determines—using the gesture detector 148—that a hand key point 804 is above the elbow key point 804" or a shoulder key point 804''' of a participant 132, the system 100 may determine that the participant 132 has raised their hand to request attention. As another example, the key points 804 from a set of multiple image frames may be analyzed to determine that a participant 132 is waving a hand back and forth to request attention. The analysis of the key points 804 may be performed directly by identifying the relative positions, velocities, and accelerations of the key points 804 of a participant 132 to a set of threshold values for the attention gestures. In one or more examples of this disclosure, analysis of key points 804 may be performed using an additional machine learning model that takes the set of key points 804 over time as an input and outputs whether an attention gesture has been performed and may utilize an artificial neural network model in addition to the artificial neural network used to generate the key points 804 from the image frame 806. When an attention gesture is detected, the system 100 may return a binary value indicating that the gesture has been detected and may also return the key points 804 of the participant 132 that made the attention gesture, which may be used to adjust the magnification and size of a person view (e.g., 420). Examples of neural networks for gesture detection from key points 804 include spatial temporal graph convolutional network (ST-GCN) and hybrid code network (HCN).

In some examples of this disclosure, the system 100 uses top down detection to detect attention seeking gestures 802. In top down detection, whether a participant 132 is present in the image frame 806 and the location of the participant 132 are first detected, and then whether the participant 132 is performing an attention gesture may be determined based on the location of the participant 132. In some examples of this disclosure, the system 100 uses top down detection with a machine learning model that takes an image frame 806 as input and outputs the location of a participant 132 within the image frame 806. The machine learning model may include an artificial neural network with multiple convolutional layers that identify the pixels of the image frame 806 that include the participant 132. A rectangle (box) that includes the identified pixels of the participant 132 may be generated to identify the location of the participant 132 of the image frame 806. Examples of neural network models for recognizing gestures include the T3D model and the DenseNet3D model. The neural network model for recognizing gestures may take a sequence of images as input data and output a gesture label that designates whether a participant 132 is waving a hand or not.

Figure 9:
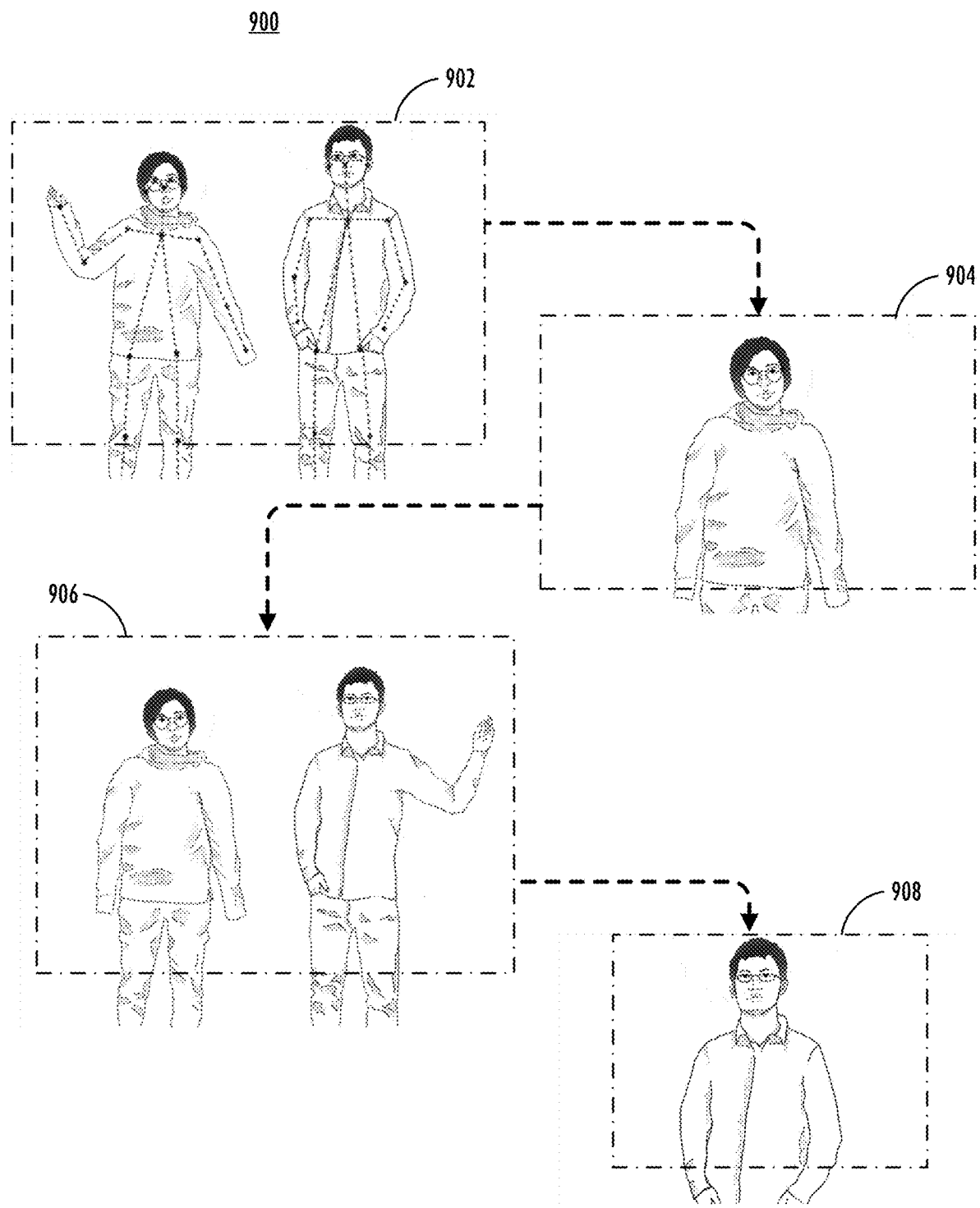
FIG. 9 illustrates uses of attention seeking gesture detection, in accordance with an example of this disclosure.

FIG. 9 illustrates the use of attention seeking gesture detection 900 to initiate and reinitiate presenter tracking, in accordance with an example of this disclosure. In the first image frame 902, the system 100 detects that Xi LU is waving her hand, so the system 100 shows Xi LU—now a subject of interest (e.g., 320, 520)—in a presenter view (e.g., 513), as shown in the next image frame 904. The video data captured when Xi LU waved her hand is an example of presenter tracking initiation data. The system has begun to operate in a presenter tracking mode (e.g., 507), and so Xi LU's position will be tracked while she talks. Thereafter, the system 100 detects that Tianran WANG is waving his hand, as shown in image frame 906. The system 100 will therefore stop tracking Xi LU a subject of interest 320, 520, start tracking Tianran WANG as the subject of interest 320, 520, and show him in a presenter view 513, as illustrated in the last image frame 908. The video data captured when Tianran WANG waved his hand is thus an example of presenter tracking deactivation data and is also an example of presenter tracking initiation data.

Figure 10:
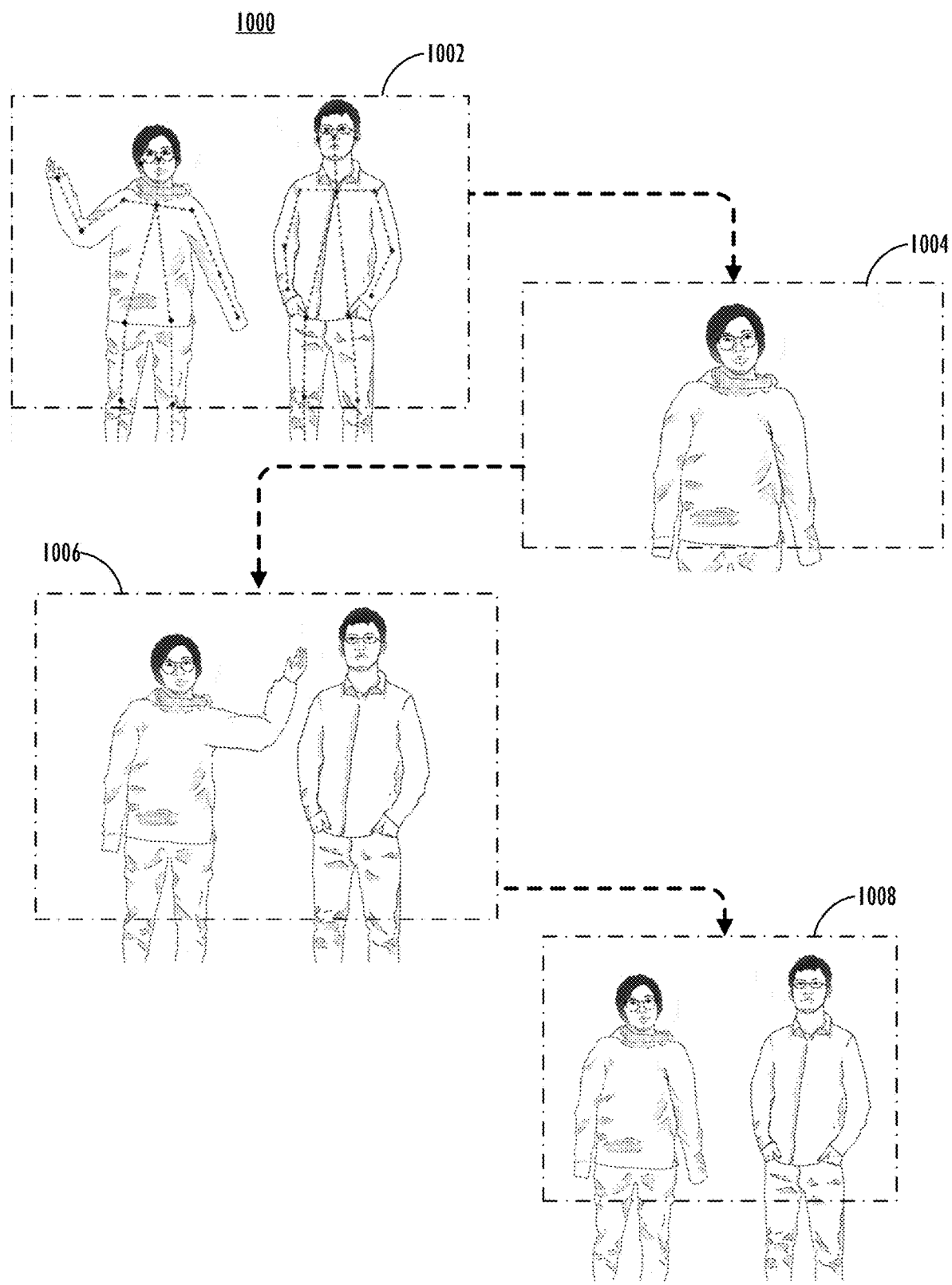
FIG. 10 illustrates uses of attention-seeking gesture detection, in accordance with an example of this disclosure.

FIG. 10 illustrates the use of attention seeking gesture detection 1000 (e.g., 900) to initiate and terminate presenter tracking, in accordance with an example of this disclosure. In the first image frame 1002, the system 100 detects that Xi LU is waving her hand, so the system 100 shows Xi LU—now a subject of interest 320, 520—in a presenter view 513, as shown in the next image frame 1004. The system 100 has thus begun to operate in a presenter tracking mode 507, and so Xi LU's position will be tracked while she talks. Thereafter, the system 100 again detects that Xi LU is waving her hand, as shown in image frame 1006. Since the system 100 was tracking Xi LU as a subject of interest 320, 520 when the system 100 detected that Xi LU was waving her hand, the system 100 will stop treating her as a subject of interest 320, 520. The video data used by the system 100 to determine that Xi LU waved her hand the second time is an example of presenter tracking deactivation data. Therefore, the system will exit the presenter tracking mode 507, return to the group view mode 302, 602, and show Xi LU and Tianran WANG in a group view (e.g., 308, 608, 808) as can be seen in the last image frame 1008. In accordance with one or more examples of this disclosure, a hand motion (e.g., hand waving) must be within a predetermined distance of the subject of interest 320, 520 and/or within a predetermined distance of the presenter tracking box (e.g., 322, 422) used to track the a subject of interest 320, 520 in order to serve as tracking presenter tracking deactivation data.

Figure 11:
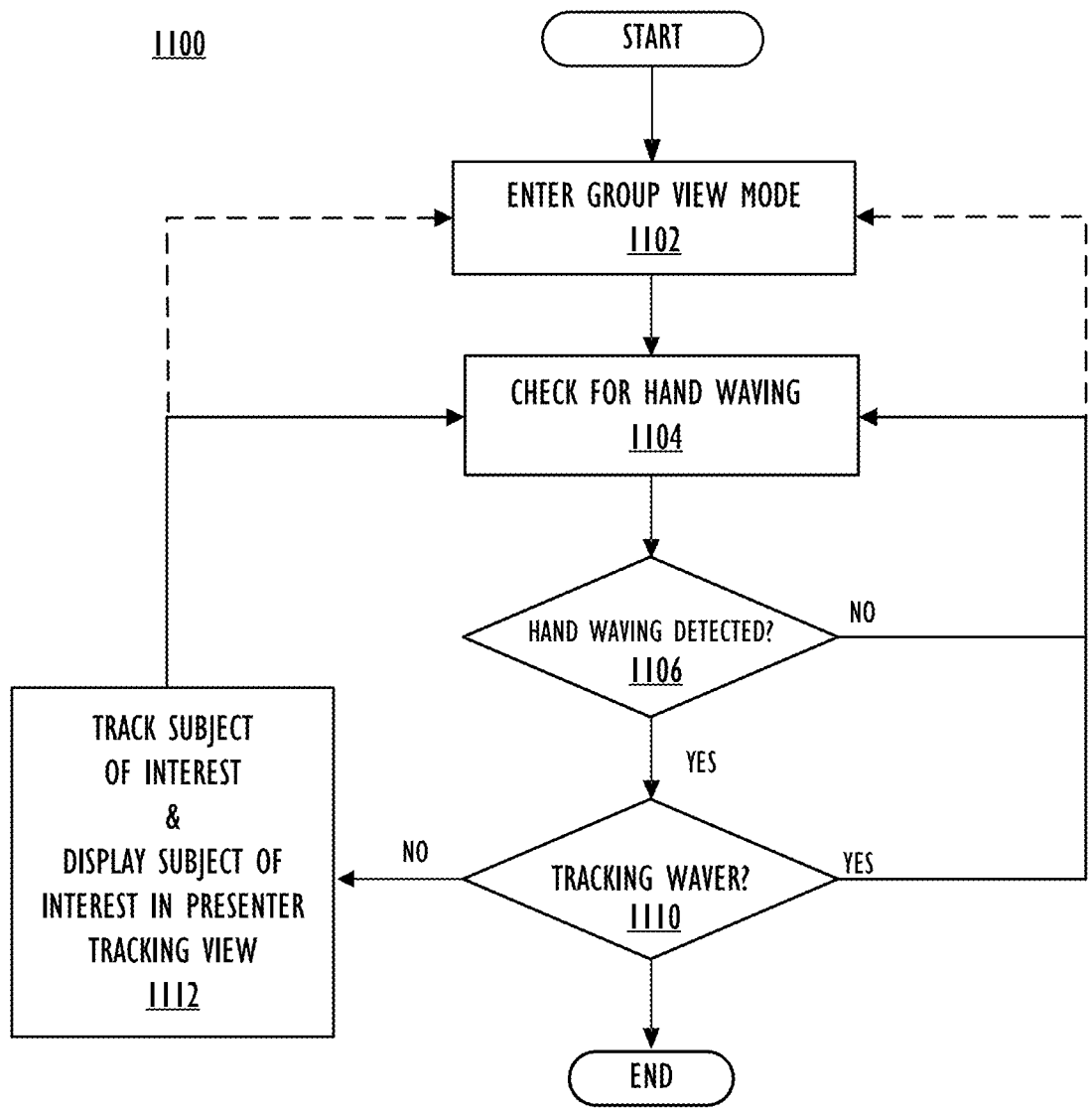
FIG. 11 illustrates another method of tracking a person making a presentation, in accordance with an example this disclosure.

FIG. 11 illustrates a method 1100 of initiating a presenter tracking mode 507 and ending a presenter tracking mode 507, in accordance with this disclosure. At the beginning of the method 1100, the system 100 enters 1102 a group view mode 302, 602 in which the system 100 will capture and present participants 132 in a group view 308, 608, 808. While in the group view mode 302, 602, the system 100 checks 1104 for hand waving by any of the participants 132. The system 100 can also detect 1106 if someone raises their hand. In accordance with the method 1100, if handwaving is detected 1106, the system 100 will determine 1110 if the participant 132 who waved their hand is already being tracked. If the participant 132 who waved their hand is not being tracked as a subject of interest 320, 520, then the hand waving participant 132 will start to be tracked and displayed 1112 in a presenter view 513 as a subject of interest 320, 520 at step 1112. As the subject of interest 320, 520 is being tracked 1112, the system 100 will continue to check 1104 for hand waving. If no further handwaving is detected and the subject of interest 320, 520 stops talking, the system 100 will re-enter 1102 the group view mode 302, 602. Alternately, if at step 1106, the participant 132 who waved their hand is already being tracked, the system 100 can treat the subsequent hand waving gesture by the subject of interest 320, 520 as an indication that the subject of interest 320, 520 is done speaking, and so the system 100 will stop tracking the participant 132 as a subject of interest 320, 520. In accordance with the method, the system 100 can continue to check 1104 for hand waving or re-enter 1102 the group view mode 302, 602.

As described above, the system 100 can detect an attention gesture, (e.g., hand waving and/or hand raising) to initiate tracking of the participant 132 who made the gesture. In one or more examples of this disclosure, the system 100 detects an attention gesture from a set of one or more image frames (e.g., 400, 510, 902) of a visual stream captured using one or more cameras (e.g., 118).

Figure 12:
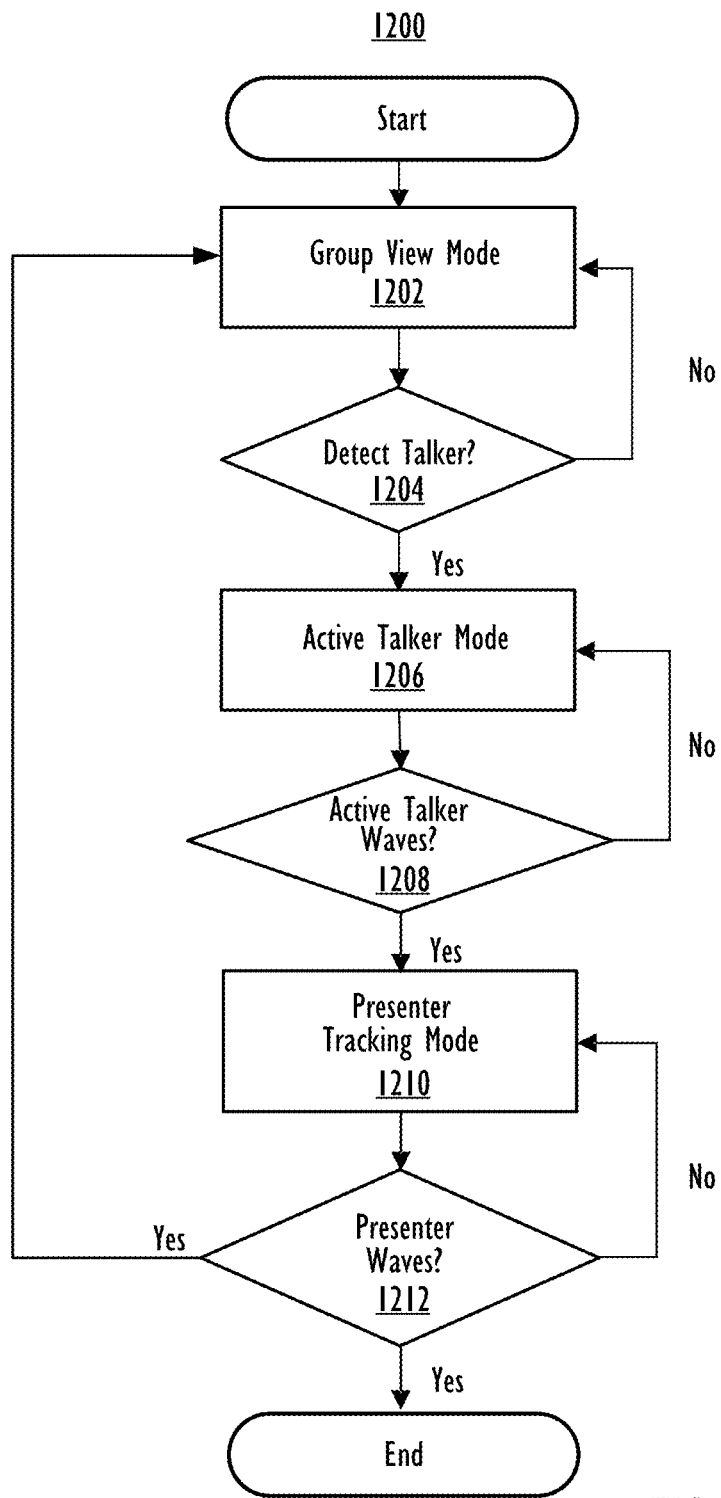
FIG. 12 illustrates another method of tracking a person making a presentation, in accordance with an example this disclosure.

FIG. 12 illustrates a method 1200 in which the presenter tracking mode 507 is initiated when the system 100 detects that an active talker 318, 618 makes an attention gesture, (e.g., waves their hand). (See discussion of FIG. 6.) At the beginning of the method 1200, the system 100 is in a group view mode 302, 602, and so videoconference participants 132 will be shown in a group view 308, 608, 808. The system 100 then determines 1204 if someone is talking. If no talking is detected the system 100 will remain in a group view mode. If a participant 132 does talk, the system 100 will enter 1206 an active talker mode 612, and the system 100 will hold that participant 132 in an active talker view 614. At step 1208 a determination will be made as to whether the actively talking participant 132 waved their hand while in the active talker view 614. If the participant 132—the active talker 318, 618—does not wave their hand, that participant 132 will remain in an active talker view 614 until they finish talking. If the actively talking participant 132 waves their hand, the system 100 will then enter 1208 a presenter tracking mode (e.g., 507) and track the location of that participant 132 as he or she moves about at a videoconferencing endpoint 101. As described regarding method 1000 of FIG. 10, if the system 100 detects the subject of interest 320, 520 wave their hand again while being tracked as a subject of interest 320, 520, the system 100 will exit 1212 the presenter tracking mode 507 and to the group view mode 302, 602. If the system 100 does not detect the subject of interest 320, 520 wave their hand while tracking that participant 132, the system 100 will continue to track the position of the subject of interest 320, 520 so that participants 142 at a far end of a videoconference will continue to see the subject of interest 320, 520 centrally located within a viewing window (e.g., 406) on a display (e.g., 130) while the subject of interest 320, 520 moves from one place to another at the video conferencing endpoint 101.

Thus far, the disclosure has described processes whereby presenter tracking is initiated. However, this disclosure also describes methods by which the system 100 helps to ensure accuracy and consistency while tracking.

Figure 13A:
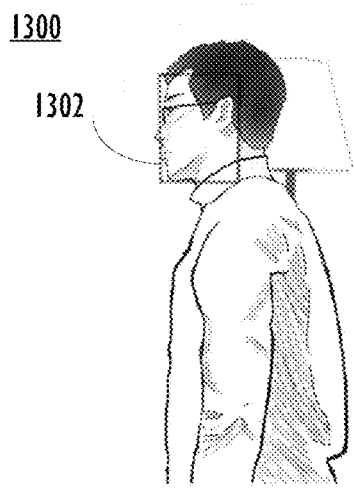
FIGS. 13A-F illustrate methods for overcoming potential tracking errors, in accordance with examples of this disclosure.
Figure 13B:
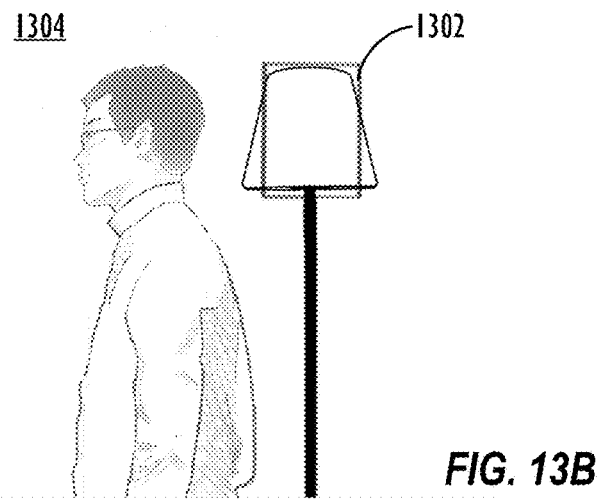

FIG. 13A shows an image frame 1300 captured at a first time. The presenter tracking box 1302 (e.g., 322, 422) is tracking Hai XU. FIG. 13B shows an image frame 1304 captured subsequently. In FIG. 13B, Hai XU is no longer in the presenter tracking box 1302. This type of situation can be known as tracking loss (or tracking lost) and corresponds to a tracking error condition. Tracking loss can occur when a presenter moves so fast that a tracking module 144 loses track of the presenter and stays focused on the background of the presenter tracking box's previous position. In one or more examples of this disclosure, the system 100 uses a static image filter 146 to determine if the presenter tracking box 1302 is staying on the background. In one or more examples of this disclosure, the system 100 accumulates the motion in the presenter tracking box 1302 and determines whether the area presenter tracking box 1302 is static once every second. If the area in the presenter tracking box 1302 remains static for five seconds, then the system determines that a tracking error is present, and the system 100 will stop tracking. In this situation, the system 100 detects the tracking error because the system 100 applies the static image filter 146 to the presenter tracking box 1302. When there is no motion in the presenter tracking box 1302 for a predetermined amount of time, (e.g., 5 seconds), the system 100 will stop tracking and return to a group view (e.g., 308, 608) as discussed above. In some examples of this disclosure, Hai XU (or whoever is making a presentation) can wave his hand and the system 100, upon detecting the hand waving motion, will begin to track him again. (See discussion of FIG. 9.)

Figure 13C:
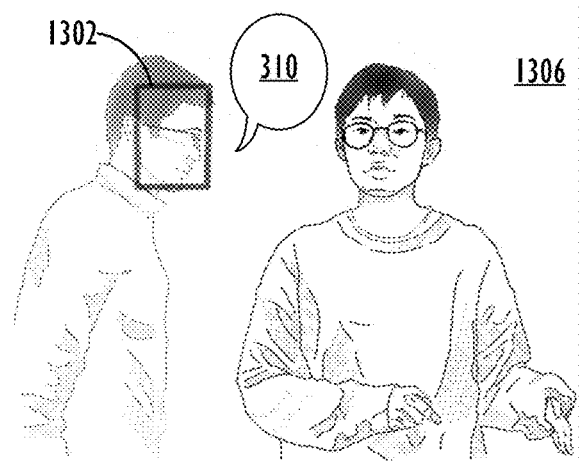
Figure 13D:
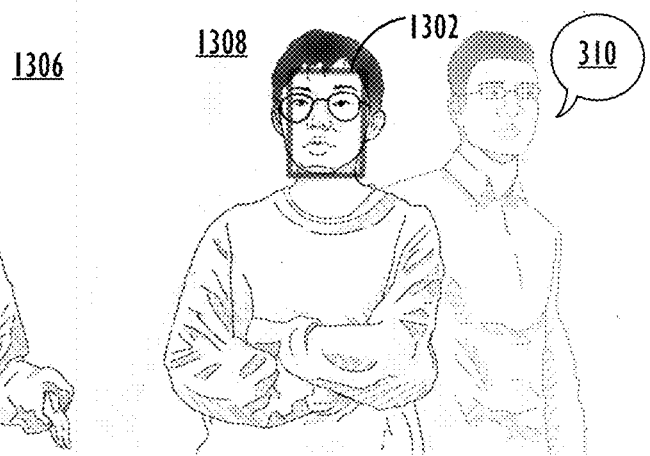

FIG. 13C illustrates an image frame 1306 in which the system 100 is tracking Hai XU in the presenter tracking box 1302, at a first moment. Audio 310 is detected corresponding to Hai XU's speech. FIG. 13D illustrates an image frame 1308 from a subsequent moment, in which the presenter tracking box 1302 has locked onto Xi LU. This situation, in which the presenter tracking box 1302 is tracking the wrong participant 132, can be called incorrect tracking, and is an example of a tracking error condition.

In some examples of this disclosure, during the presenter tracking mode (e.g., 507), the system 100 intermittently checks for audio (e.g., 310, 610) corresponding to the presenter tracking box 1302. In FIG. 13C and FIG. 13D, because Xi LU is polite, she does not talk while Hai XU is making his presentation. If there is no audio 310 which corresponds to the location of the presenter tracking box 1302 for a predetermined amount of time (e.g., 20 seconds), the system 100 will stop tracking the participant 132 of the presenter tracking box 1302 as a subject of interest (e.g., 320, 520). In FIG. 13D the system 100 is detecting audio 310 coming from Hai XU's position but no audio 310 corresponding to the location of the presenter tracking box 1302. Because there is no audio 310 which matches the location of the presenter tracking box 1302, the system 100 will reset, and return to the group view mode (e.g., 302, 602), or will start to track Hai XU in accordance with one or more of the methods described above. Additional methods of obviating incorrect tracking are explained with reference to FIG. 14 and FIG. 15.

Figure 13E:
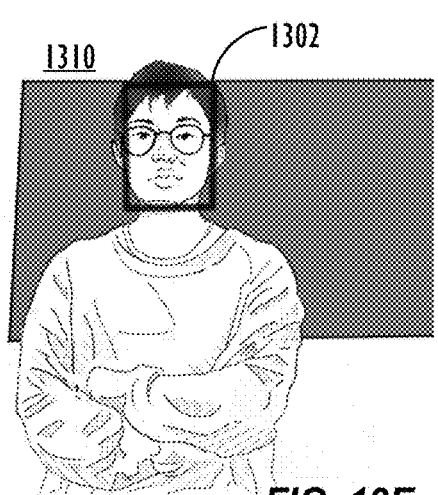
Figure 13F:
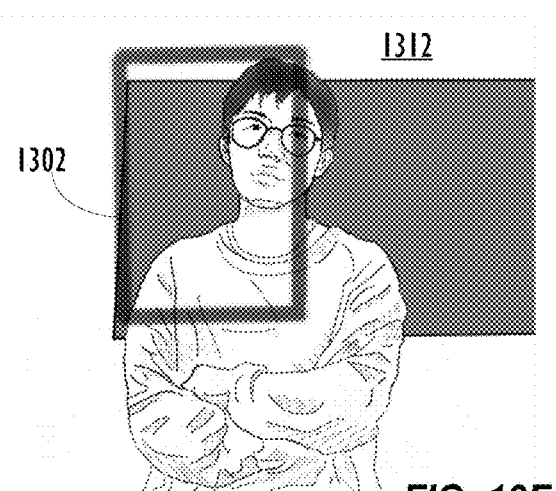

FIG. 13E illustrates an image frame 1310 in which the system 100 is tracking Xi LU in the presenter tracking box 1302, at a first moment. As Xi LU talks, the presenter tracking box 1302 tends to get larger, as seen in FIG. 13F, in which Xi LU has perhaps spoken for 2-3 minutes. Such enlargement of a presenter tracking box 1302 over time can be called tracking drift. Since the viewing window (e.g., 406, 506) will be based on the presenter tracking box 1302, it can be advantageous to update the size of the presenter tracking box 1302 and thereby minimize tracking drift. Methods of minimizing tracking drift are presented below with reference to FIG. 16 and FIGS. 17A-C.

Tracking error can occur when a presenter walks cross another participant 132, and the tracking module 144 takes another participant 132 as the target by mistake. To prevent tracking error from becoming a problem, when the system 100 begins to track a subject of interest 320, 520, the system 100 saves a sequence images of the presenter.

During the presenter tracking process, personage objects (e.g., features) of the participant 132 in the presenter tracking box (e.g., personage objects like eye shape, skin tone, head size) are compared to the features in the saved images. If the degree of similarity between the features of the tracked participant 132 and the features in the saved images is too slight, the presenter tracking process will be cancelled and/or reset.

In one or more examples of this disclosure, images of the tracked participant 132 are extracted and analyzed using an artificial neural network of a processor or other suitable method for producing features information relating to the views.

In at least one example of this disclosure, the features of the subject of interest 320, 520 and the features of the from the saved images are compared every two seconds, and if the features are not sufficiently similar, the tracker will be reset.

Figure 14:
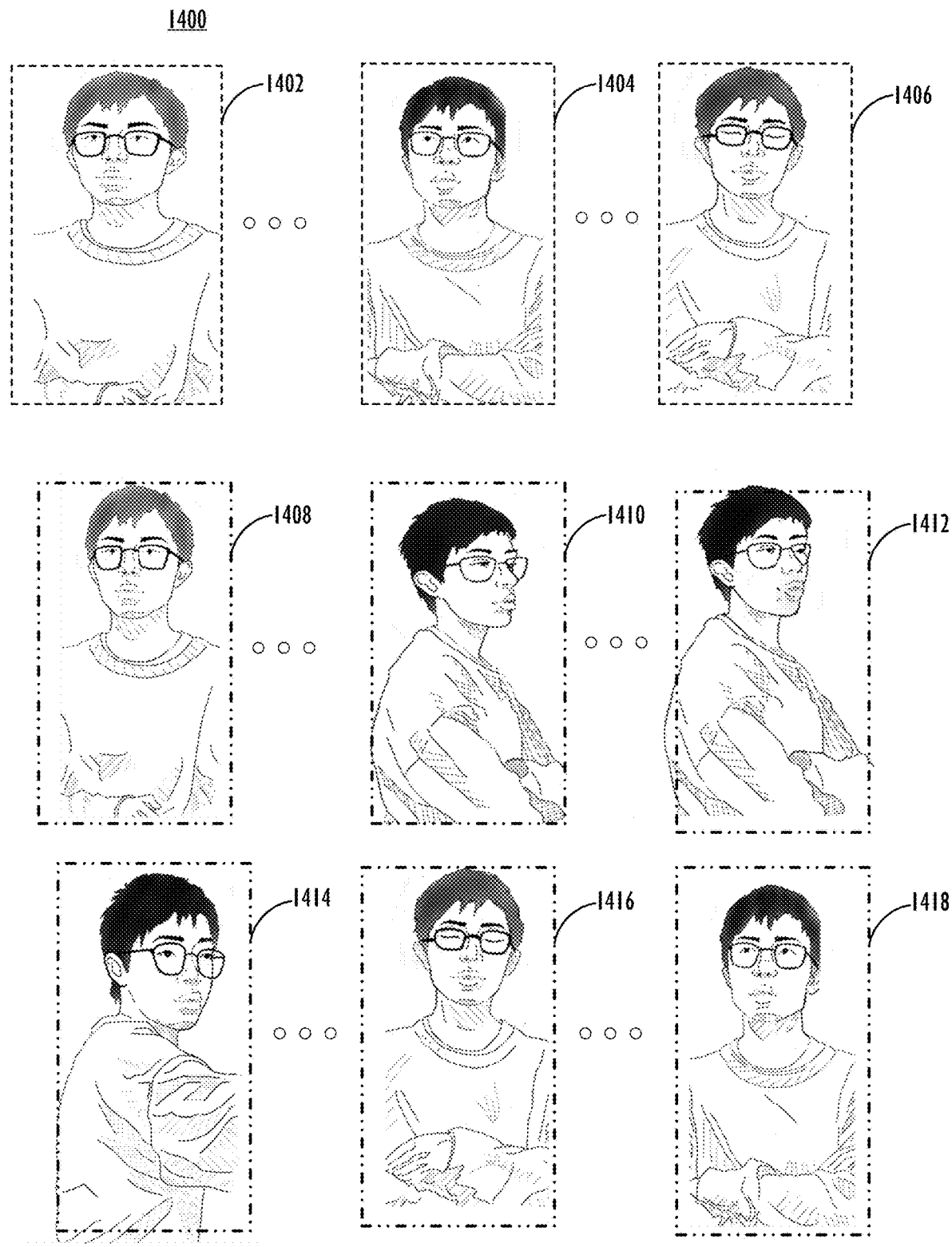
FIG. 14 illustrates a method by which the videoconferencing system significantly minimizes tracking errors, in accordance with an example this disclosure.

FIG. 14 illustrates a method 1400 by which the system 100 checks for incorrect tracking. Image frame 1402, image frame 1404, and image frame 1404 show images of Xi LU captured by the system 100, e.g., when the system 100 is in an active talker mode (e.g., 612). Image frame 1408, image frame 1410, image frame 1412, image frame 1414, image frame 1416, image frame 1418 are image frames (e.g., 400, 510, 902) of Xi LU captured as the system tracks Xi LU as a subject of interest (e.g., 520, 320). Image frame 1408 through image frame 1418 each correspond to a presenter tracking box (e.g., 1302). While the system 100 tracks Xi LU during the presenter tracking mode (e.g., 507), the system 100 compares her features of a current presenter tracking box 1302, e.g., features in image frame 1418, with her features captured while the system 100 was in the active talker mode, (image frame 1402, image frame 1404, and image frame 1406).

In some examples of this disclosure the system 100 will continue to check for active talkers (e.g., 318, 618) while in the presenter tracking mode (e.g., 507). For example, if the system 100 determines that Xi LU is an active talker during her presentation, the system 100 may begin to use her facial features from the more recently acquired attendant face box (e.g., 416) as a reference instead of those from the initial active talker detection (e.g., image frame 1402, image frame 1402, and image frame 1406). (See e.g., FIG. 18).

Figure 15:
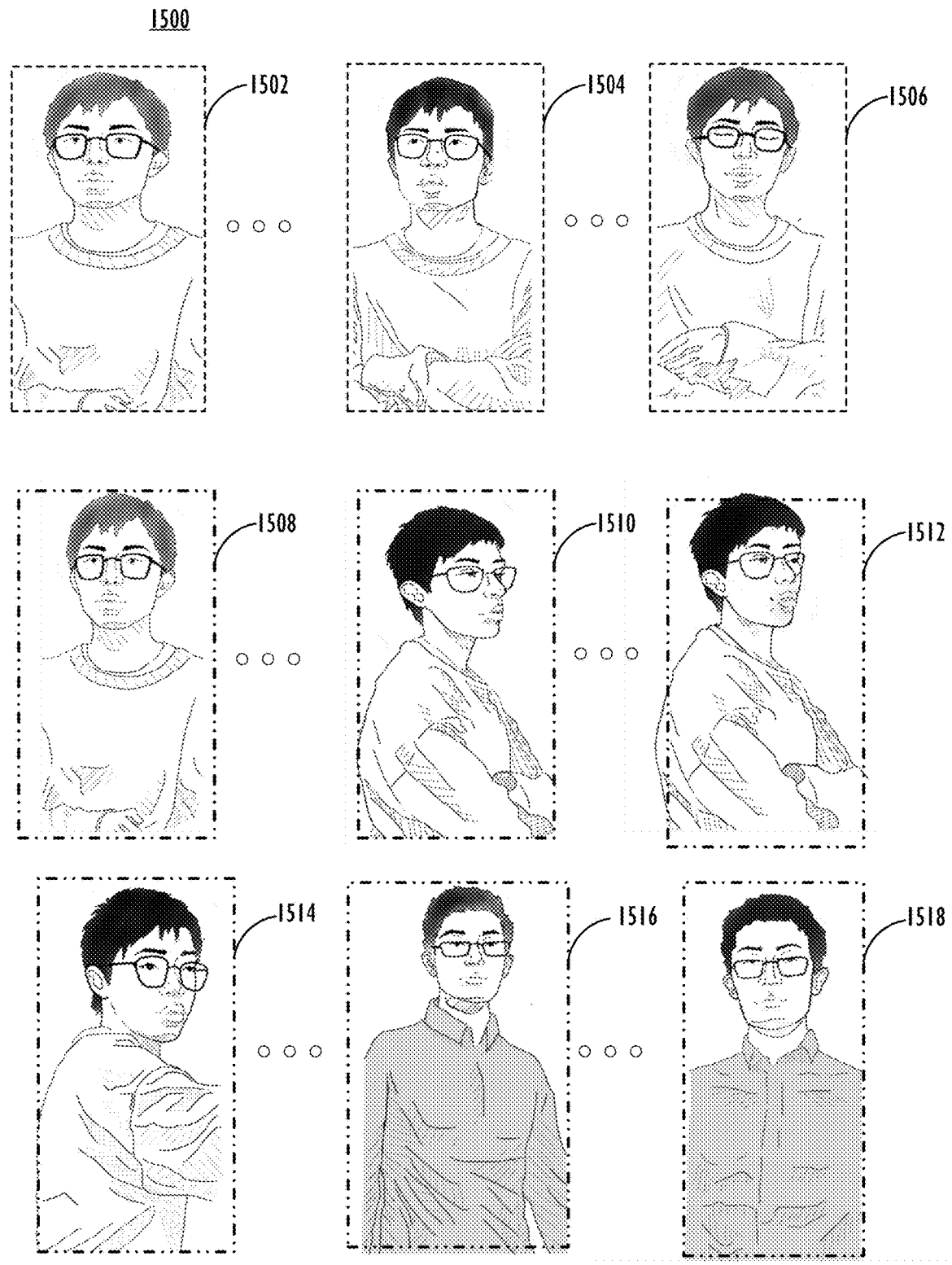
FIG. 15 illustrates another method by which the videoconferencing significantly minimizes tracking errors, in accordance with an example this disclosure.

FIG. 15 illustrates a method 1500 by which the system 100 checks for incorrect tracking. Image frame 1502, image frame 1504, and image frame 1504 show images of Xi LU captured by the system 100, e.g., when the system 100 is in an active talker mode (e.g., 612). Image frame 1508, image frame 1510, image frame 1512, image frame 1514, image frame 1516, image frame 1518 are image frames (e.g., 400, 510, 902) captured as the system 100 tracks Xi LU as a subject of interest (e.g. 320, 520). Image frame 1508 through image frame 1518 each correspond to a presenter tracking box (e.g., 1302). While the system 100 tracks Xi LU during the presenter tracking mode 612, the system 100 compares personage objects (e.g., features) of the current presenter tracking box 1302, with those of earlier image frames (e.g., 400, 510, 902). In method 1500, when the system 100 compares features from image frame 1516 and image frame 1518 with Xi LU's features from image frame 1502, image frame 1504, and image frame 1506, the system 100 will determine that the features are not similar. Instead of tracking the wrong participant 132—in this case Hai XU—the system 100 will terminate the current presenter tracking mode (e.g., 507). The system 100 can return to the group view mode 302, 602 mode and quickly re-Identify Xi LU as an active talker (e.g., 318, 618), and recommence tracking her as a subject of interest 320, 502 in a new instance of the presenter tracking mode 507.

Figure 16:
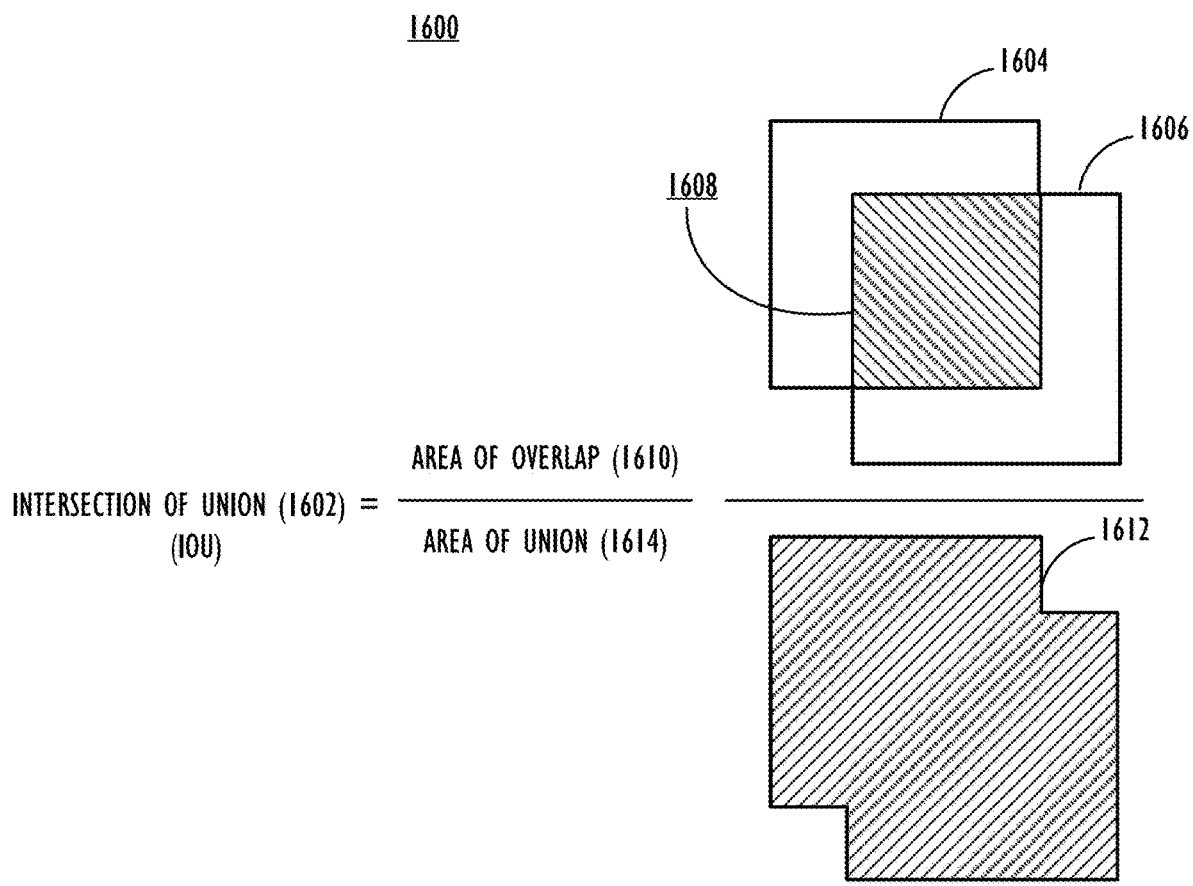
FIG. 16 illustrates further aspects of tracking error minimization, in accordance with an example of this disclosure.

FIG. 16 illustrates a method 1600 of determining an intersection of union (IOU) 1602, in accordance with an example of this disclosure. A first region 1604 overlaps with a second region 1606. The region 1608 in which the two regions intersect has a first area 1610. The region 1612 that the two regions collectively occupy has a second area 1614. The IOU 1602 of the regions is the first area 1610 divided by the second area 1614.

Figure 17A:
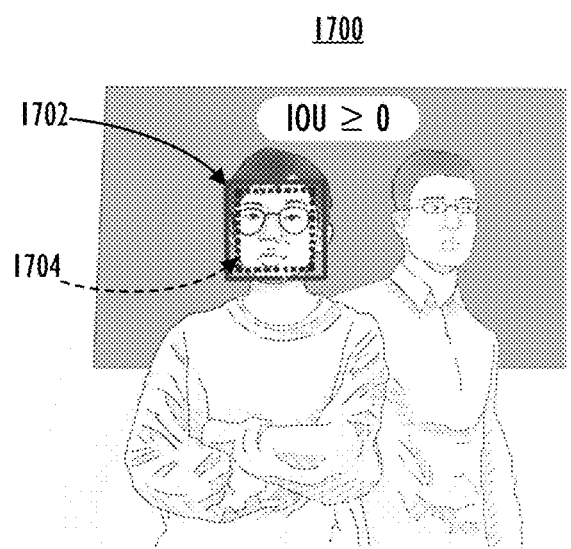
FIGS. 17A through 17C illustrate aspects of tracking error minimization, in accordance with examples of this disclosure.
Figure 17B:
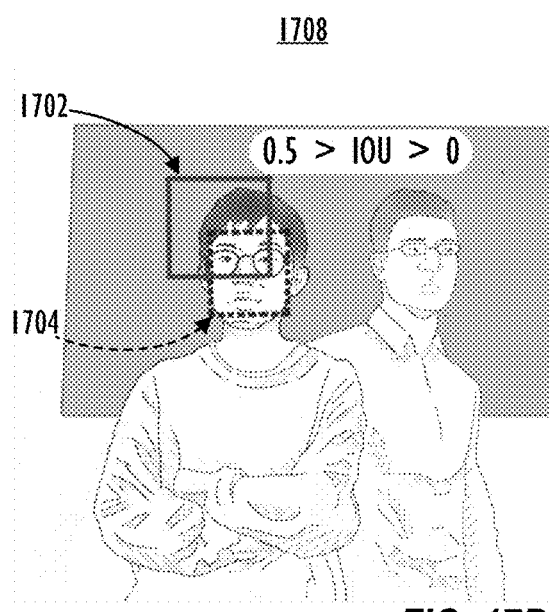
Figure 17C:
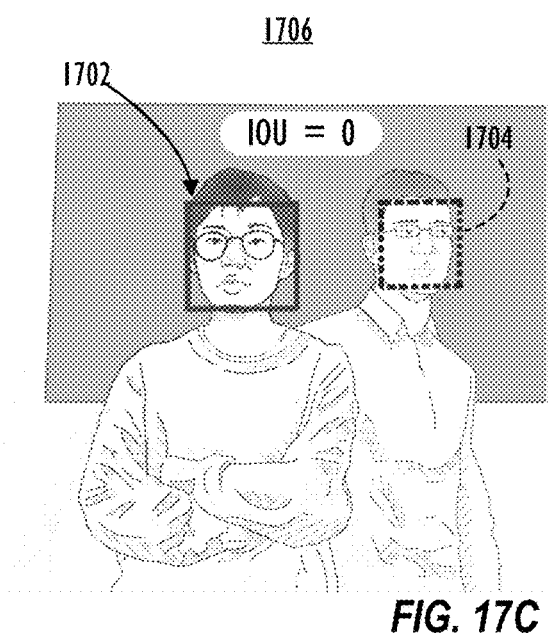

FIGS. 17A-17C illustrate examples in which the system 100 minimizes tracking drift. FIG. 17A illustrates an image frame 1700 containing Xi LU and Hai XU. The presenter tracking box 1702 estimates the location of Xi LU's face. There is also an active talker box 1704 (e.g., 624). The presenter tracking box 1702 fully encompasses the active talker box 1704, as shown. The IOU (see FIG. 16) between the two boxes is greater than or equal 0.5, indicating that the presenter tracking box 1702 is accurately tracking Xi LU's location and that tracking drift is not an issue. In the image frame 1708 of FIG. 17B, however, the IOU between the presenter tracking box 1702 and the active talker box 1704 has fallen below 50%. Tracking drift has therefore become an issue. Since the viewing window (e.g., 406) presented to the far end (e.g. 102) of a video conference would be located and sized based on the location and size of the presenter tracking box 1702, Xi LU would appear off center in the viewing window. FIG. 17C shows an image frame in which the presenter tracking box 1702 and the active talker box 1704 do not overlap whatsoever. The value of the IOU between the presenter tracking box 1702 and the current active talker box 1704 of FIG. 17C is zero. In FIG. 17C, Hai XU is the talker who was detected and the IOU between the boxes is zero, which is not an indication a tracking drift. Hence the presenter tracking box 1702 will not be reset. It is worth noting that the situation described with respect to FIG. 17C is not one of tracking error. In FIG. 17C, the system 100 has simply detected Hai XU talking while the system 100 tracks Xi LU in the active talker mode 612. If on the other hand, Hai XU continues to talk and Xi LU stops talking, the system 100 can start to track Hai XU's position in accordance with one or more of the methods described above.

Figure 18:
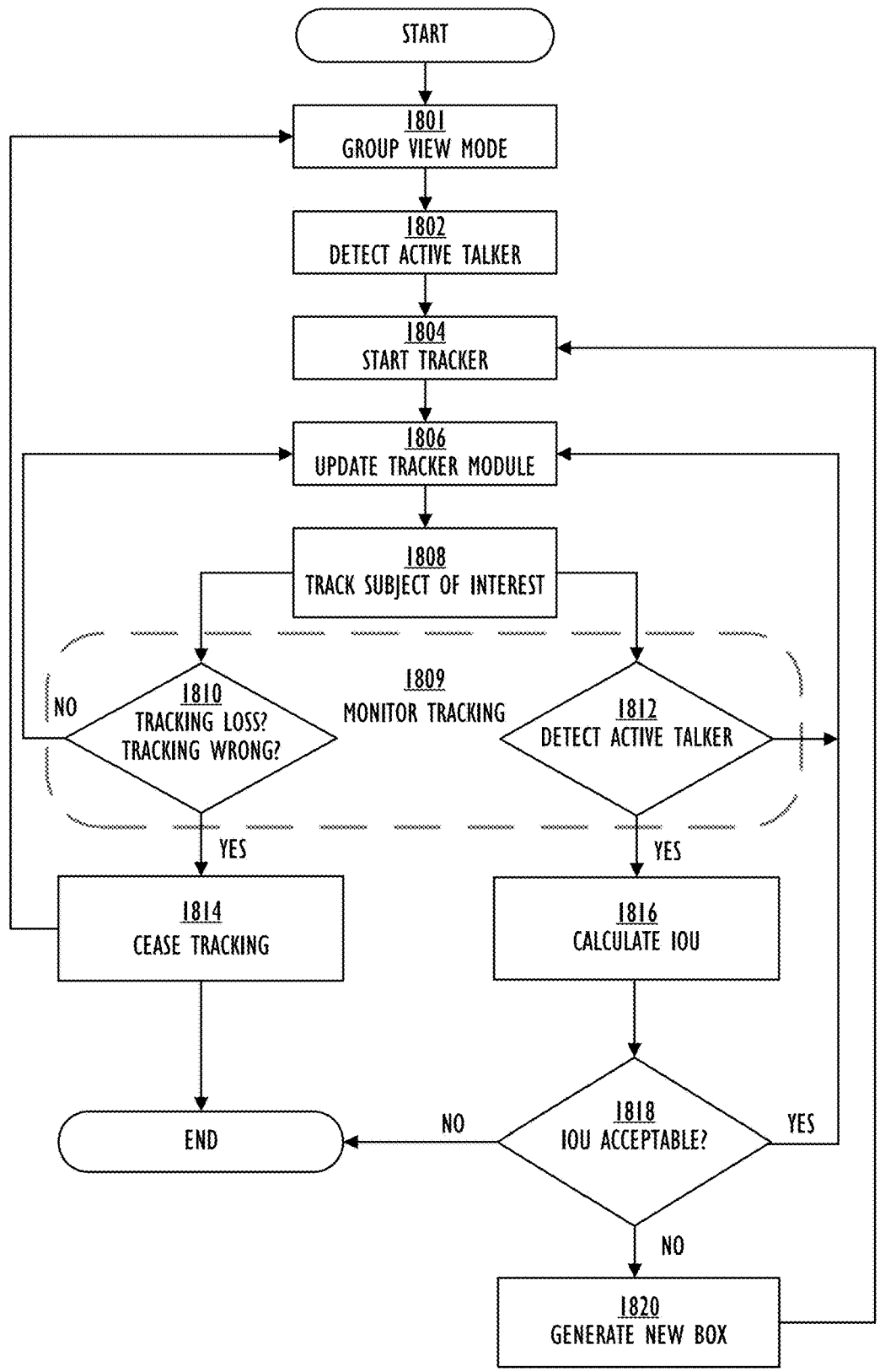
FIG. 18 illustrates another method of tracking a person making a presentation, in accordance with an example this disclosure.

FIG. 18 illustrates a method 1800 of adjusting for and minimizing any effects from tracking loss, incorrect tracking, and tracking drift, in accordance with an example of this disclosure. The method 1800 begins by the system 100 entering 1801 a group view mode 302, 602, and then detecting 1802 an active talker 318, 618. In detecting the active talker 318, 618, the system 100 generates an active talker box 624. If an active talker 318, 618 is not detected 1802, the system 100 will remain in the group view mode 302, 602. When an active talker 318, 618 has been found 1802, the system 100 will enter 1804 a presenter tracking mode 507. While in the presenter tracking mode 507, the system 100 will update the tracking module 144 with the size and location of the active talker box 624. That is, the active talker box 624 can serve as the initial presenter tracking box 322, 422. In accordance with the method 1800, the system 100 treats the active talker 318, 618 as a subject of interest 320, 520, generates a presenter tracking box 322, 422 and tracks 1808 the location of the subject of interest 320, 520 in the presenter tracking box 322, 422. As the system 100 tracks 1808 the subject of interest 320, 520, the tracking module 144 monitors 1809 the accuracy of the presenter tracking process. If the system 100 determines 1810 that the system 100 has lost track of the subject of interest 320, 520, (e.g., using a static image filter) or if the system 100 detects that that the system 100 is tracking the wrong participant 132 (e.g., the personage objects in the tracking region 405, 505 are not sufficiently similar to the features from the active talker box or earlier instances of the presenter tracking box 322, 422), the system 100 will end 1814 the current presenter tracking process due to the tracking error condition. If a tracking loss or other incorrect tracking condition is detected 1810, the system 100 will cancel 1814 the current tracking operation, (and return 1801 to the group view mode 302, 602 or perform some other type of reset operation.) Alternately, if the system 100 stops 1814 tracking 1808, the method 1800 can end. As the subject of interest 320, 520 is tracked, the system 100 continues to evaluate 1809 new image frames (e.g., 400, 510, 902) against the tracking region 405, 505 of earlier image frames (e.g., 400, 510, 902) and continues to update 1806 the tracking module 144 and generate 1808 new presenter tracking boxes 322, 422 based on new information. As the system 100 tracks 1808 the subject of interest 320, 520, the system 100 continues in parallel to check for active talkers, which as discussed involves detecting audio and checking for a face corresponding to the location from which the audio is emanating. If an active talker is detected, facial features of the active talker will be within an active talker box 624. The system 100 also determines, independently of the other processes described, whether an active talker 318, 618 has been detected after tracking has begun 1804. If the system 100 detects 1812 an active talker 318, 618 while the system 100 is currently tracking a subject of interest 320, 520, the system 100 will determine 1816 the IOU (e.g., 1602) between the presenter tracking box 322, 422 and the active talker view 614 corresponding to the active talker 318, 618 detected. (The concept of IOU is explained in FIG. 16.) Depending on the value of the IOU value calculated, the system 100 may determine that correction to the presenter tracking box's size is necessary, in which case the presenter tracking box 322, 422 will be reset 1820 to coincide with the active talker view 614. Recall that if the IOU falls below a predetermined threshold value (e.g., 0.5), that can mean that the presenter tracking box 322, 422 is insufficiently centered on the face box. Recall too that the presenter view (e.g., 513) is derived from the presenter tracking box 322, 422. If the presenter tracking box 322, 422 is not sufficiently aligned with the active talker box (e.g., 1704), the participant 132 being tracked could appear non-centrally located in the presenter view 513 or at a less than desirable magnification level, which would detract from the user experience. Thus, by resetting 1820 the presenter tracking box 322, 422 to coincide with the active talker box 1704 in accordance with the method 1880 the system 100 significantly reduces issues which could arise from tracking drift.

FIG. 19 illustrates an electronic device 1900 (e.g., 100, 200) which can be employed to practice the concepts and methods described. The components disclosed described can be incorporated in whole or in part into tablet computers, personal computers, handsets, and other devices utilizing one or more input devices 1990 such as microphones, keyboards, etc. As shown, device 1900 can include a processing unit (CPU or processor) 1920 (e.g., 208) and a system bus 1910 (e.g., 216). System bus 1910 interconnects various system components—including the system memory 1930 such as read only memory (ROM) 1940 and random-access memory (RAM) 1950—to the processor 1920. The bus 1910 connects processor 1920 and other components to a communication interface 1960 (e.g., 116) The processor 1920 can comprise one or more digital signal processors. The device 1900 can include a cache 1922 of high-speed memory connected directly with, near, or integrated as part of the processor 1920. The device 1900 copies data from the memory 1930 and/or the storage device 1980 to the cache 1922 for quick access by the processor 1920. In this way, the cache provides a performance boost that avoids processor 1920 delays while waiting for data. These and other modules can control or be configured to control the processor 1920 to perform various actions. Other system memory 1930 may be available for use as well. The memory 1930 can include multiple different types of memory with different performance characteristics. The processor 1920 can include any general-purpose processor and a hardware module or software module, such as module 1 (1962), module 2 (1964), and module 3 (1966) stored in storage device 1980, configured to control the processor 1920 as well as a special-purpose processor where software instructions are incorporated into the actual processor design. The processor 1920 may essentially be a completely self-contained computing system, containing multiple cores or processors, a bus, memory controller, cache, etc. A multi-core processor may be symmetric or asymmetric.

The system bus 1910 may be any of several types of bus structures including a memory bus or memory controller, a peripheral bus, and a local bus using any of a variety of bus architectures. A basic input/output system (BIOS) stored in ROM 1940 or the like, may provide the basic routine that helps to transfer information between elements within the device 1900, such as during start-up. The device 1900 further includes storage devices 1980 such as a hard disk drive, a magnetic disk drive, an optical disk drive, tape drive or the like. The storage device 1980 can include software modules 1962, 1964, 1966 for controlling the processor 1920. Other hardware or software modules are contemplated. The storage device 1980 is connected to the system bus 1910 by a drive interface. The drives and the associated computer readable storage media provide nonvolatile storage of computer readable instructions, data structures, program modules and other data for the device 1900. In at least one example, a hardware module that performs a function includes the software component stored in a non-transitory computer-readable medium coupled to the hardware components—such as the processor 1920, bus 1910, output device 1970, and so forth—necessary to carry out the function.

For clarity of explanation, the device of FIG. 19 is presented as including individual functional blocks including functional blocks labeled as a "processor." The functions these blocks represent may be provided using either shared or dedicated hardware, including, but not limited to, hardware capable of executing software and hardware, such as a processor 1920, that is purpose-built to operate as an equivalent to software executing on a general-purpose processor. For example, the functions of one or more processors presented in FIG. 19 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 1940 for storing software performing the operations discussed in one or more examples below, and random-access memory (RAM) 1950 for storing results. Very large-scale integration (VLSI) hardware examples, as well as custom VLSI circuitry in combination with a general-purpose DSP circuit can also be used.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:

1. A method of tracking a presenter during a videoconference, comprising:
   detecting, in a data stream, data indicating a presence of one or more persons at a videoconferencing endpoint, the data stream comprising a plurality of frames;
   detecting tracker initiation data in the data stream;
   determining, within a second frame of the data stream, a subject of interest from among the one or more persons, responsive to detecting the tracker initiation data;
   determining a tracking region within a third frame of the data stream, the tracking region corresponding to the subject of interest and having a size and location;
   tracking the subject of interest, wherein tracking the subject of interest comprises iteratively:
      comparing data of one or more subregions of one or more subsequent frames to the data of the tracking region, the sizes and locations of the one or more subregions being based on the size and location of the tracking region;
      detecting, among the one or more subregions, a subregion depicting the subject of interest; and
      designating the subregion depicting the subject of interest as the tracking region;

detecting tracker deactivation data within the data stream;
ceasing to track the subject of interest, responsive to detecting the tracker deactivation data; and
searching for data corresponding to one or more persons within one or more further subsequent frames of the data stream.

2. The method of claim 1, wherein detecting the tracker deactivation data within the data stream comprises detecting data indicative of a hand motion within a predetermined distance of the tracking region.

3. The method of claim 1, wherein detecting the tracker initiation data in the data stream comprises:
detecting audio data at the videoconferencing endpoint;
identifying a source of sound location as corresponding to the audio data; and
detecting, within the second frame of the data stream, data consistent with a first personage object corresponding to the source of sound location, the first personage object being a face; and
wherein determining the subject of interest comprises detecting data consistent with one or more second personage objects within a predetermined distance of the first personage object within the second frame.

4. The method of claim 1, wherein detecting the tracker initiation data in the data stream comprises detecting data indicative of a hand motion at a region within the second frame of the data stream; and
wherein determining the subject of interest comprises detecting data consistent with one or more personage objects within a predetermined distance of the region within the second frame of the data stream.

5. The method of claim 4, wherein detecting the data indicative of the hand motion at the region within the second frame of the data stream comprises detecting data of a hand raising motion at the region within the second frame of the data stream.

6. The method of claim 4, wherein detecting the data indicative of the hand motion at the region within the second frame of the data stream comprises detecting data of a hand waving motion at the region within the second frame of the data stream.

7. The method of claim 1, wherein detecting the tracker initiation data in the data stream comprises:
detecting audio data at the videoconferencing endpoint;
identifying a source of sound location as corresponding to the audio data; and
detecting, within the second frame of the data stream, data consistent with a first personage object corresponding to the source of sound location, the first personage object being a face;
detecting data indicative of a hand motion at a region within a predetermined distance of the first personage object with the second frame of the data stream; and
wherein determining the subject of interest comprises detecting data consistent with one or more second personage objects within a predetermined distance of the first personage object within the second frame.

8. A videoconferencing system, comprising:
one or more cameras; and
a processor coupled to the one or more cameras, wherein the processor is configured to:
capture a data stream using the one or more cameras, the data stream comprising a plurality of frames;
detect, in the data stream, data indicating a presence of one or more persons at a videoconferencing endpoint;
detect tracker initiation data in the data stream;
determine, responsive to detecting the tracker initiation data, a subject of interest from among the one or more persons within a second frame of the data stream;
determine a tracking region within a third frame of the data stream, the tracking region corresponding to the subject of interest and having a size and location;
track the subject of interest by iteratively:
comparing data of one or more subregions of one or more subsequent frames to the data of the tracking region, the sizes and locations of the one or more subregions being based on the size and location of the tracking region;
detecting, among the one or more subregions, a subregion depicting the subject of interest; and
designating the subregion depicting the subject of interest as the tracking region;
detect tracker deactivation data within the data stream;
stop tracking the subject of interest, responsive to detecting the tracker deactivation data; and
search for data corresponding to one or more persons within one or more further subsequent frames of the data stream.

9. The videoconferencing system of claim 8, wherein the processor is further configured to:
detect the tracker deactivation data within the data stream by detecting data indicative of a hand motion within a predetermined distance of the tracking region.

10. The videoconferencing system of claim 8, further comprising one or more microphones, wherein processor is further configured to:
detect the tracker initiation data in the data stream by:
detecting audio data at the videoconferencing endpoint;
identifying a source of sound location as corresponding to the audio data; and
detecting, within the second frame of the data stream, data consistent with a first personage object corresponding to the source of sound location, the first personage object being a face; and
determine the subject of interest by detecting data consistent with one or more second personage objects within a predetermined distance of the first personage object within the second frame.

11. The videoconferencing system of claim 8, wherein the processor is further configured to:
detect the tracker initiation data in the data stream by detecting data indicative of a hand motion at a region within the second frame of the data stream; and
determine the subject of interest by detecting data consistent with one or more personage objects within a predetermined distance of the region within the second frame of the data stream.

12. The videoconferencing system of claim 11, wherein the processor is further configured to detect the data indicative of the hand motion at the region within the second frame of the data stream by detecting data of a hand raising motion at the region within the second frame of the data stream.

13. The videoconferencing system of claim 11, wherein the processor is further configured to detect the data indicative of the hand motion at the region within the second frame of the data stream by detecting data of a hand waving motion at the region within the second frame of the data stream.

14. The videoconferencing system of claim 8, wherein the processor is further configured to detect the tracker initiation data in the data stream by:

detecting audio data at the videoconferencing endpoint;
identifying a source of sound location as corresponding to the audio data; and
detecting, within the second frame of the data stream, data consistent with a first personage object corresponding to the source of sound location, the first personage object being a face;
detecting data indicative of a hand motion at a region within a predetermined distance of the first personage object with the second frame of the data stream; and
determine the subject of interest by detecting data consistent with one or more second personage objects within a predetermined distance of the first personage object within the second frame.

15. A non-transitory computer readable medium storing instructions executable by a processor, wherein the instructions comprise instructions to:
capture a data stream using one or more cameras, the data stream comprising a plurality of frames;
detect, in the data stream, data indicating a presence of one or more persons at a videoconferencing endpoint;
detect tracker initiation data in the data stream;
determine, responsive to detecting the tracker initiation data, a subject of interest from among the one or more persons within a second frame of the data stream;
determine a tracking region within a third frame of the data stream, the tracking region corresponding to the subject of interest and having a size and location;
track the subject of interest, wherein the instructions to track the subject of interest comprise instructions to iteratively:
compare data of one or more subregions of one or more subsequent frames to the data of the tracking region, the sizes and locations of the one or more subregions being based on the size and location of the tracking region;
detect, among the one or more subregions, a subregion depicting the subject of interest; and
designate the subregion depicting the subject of interest as the tracking region;
detect tracker deactivation data within the data stream;
cease to track the subject of interest, responsive to detecting the tracker deactivation data; and
search for data corresponding to one or more persons within one or more further subsequent frames of the data stream.

16. The non-transitory computer readable medium of claim 15, wherein the instructions to detect the tracker deactivation data within the data stream comprise instructions to detect data indicative of a hand motion within a predetermined distance of the tracking region.

17. The non-transitory computer readable medium of claim 15, wherein the instructions to detect the tracker initiation data in the data stream comprise instructions to:
capture audio data, using one or more microphones;
identify a source of sound location as corresponding to the audio data; and
detect, within the second frame of the data stream, data consistent with a first personage object corresponding to the source of sound location, the first personage object being a face; and
the instructions to determine the subject of interest comprise instructions to detect data consistent with one or more second personage objects within a predetermined distance of the first personage object within the second frame.

18. The non-transitory computer readable medium of claim 15, wherein:
the instructions to detect the tracker initiation data in the data stream comprise instructions to detect data indicative of a hand motion at a region within the second frame of the data stream; and
the instructions to determine the subject of interest comprise instructions to detect data consistent with one or more personage objects within a predetermined distance of the region within the second frame of the data stream.

19. The non-transitory computer readable medium of claim 18, wherein the instructions to detect the data indicative of the hand motion at the region within the second frame of the data stream comprise instructions to detect data of a hand raising motion at the region within the second frame of the data stream.

20. The non-transitory computer readable medium of claim 18, wherein the instructions to detect the data indicative of the hand motion at the region within the second frame of the data stream comprise instructions to detect data of a hand waving motion at the region within the second frame of the data stream.

21. The non-transitory computer readable medium of claim 15, wherein the instructions to detect the tracker initiation data in the data stream comprise instructions to:
detect audio data at the videoconferencing endpoint;
identify a source of sound location as corresponding to the audio data; and
detect, within the second frame of the data stream, data consistent with a first personage object corresponding to the source of sound location, the first personage object being a face; and
detect data indicative of a hand motion at a region within a predetermined distance of the first personage object with the second frame of the data stream; and
wherein the instructions to determine the subject of interest comprise instructions to detect data consistent with one or more second personage objects within a predetermined distance of the first personage object within the second frame.

* * * * *